United States Patent
Kumar et al.

(10) Patent No.: US 10,489,126 B2
(45) Date of Patent: Nov. 26, 2019

(54) AUTOMATED CODE GENERATION

(71) Applicant: Oracle International Corporation, Redwood Shores, CA (US)

(72) Inventors: Sathish S. B. Kumar, Bangalore (IN); Prantik Sen, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/996,311

(22) Filed: Jun. 1, 2018

(65) Prior Publication Data
US 2019/0250891 A1     Aug. 15, 2019

(30) Foreign Application Priority Data
Feb. 12, 2018 (IN) .............................. 201841005130

(51) Int. Cl.
*G06F 9/44* (2018.01)
*G06F 8/38* (2018.01)
(Continued)

(52) U.S. Cl.
CPC .................. *G06F 8/38* (2013.01); *G06F 8/34* (2013.01); *G06F 8/35* (2013.01); *G06K 9/38* (2013.01);
(Continued)

(58) Field of Classification Search
CPC .... G06F 8/38; G06F 8/34; G06F 8/10; G06Q 10/06
(Continued)

(56) References Cited

U.S. PATENT DOCUMENTS

| | | |
|---|---|---|
| 5,386,508 A | 1/1995 | Itonori et al. |
| 5,404,441 A | 4/1995 | Satoyama |

(Continued)

FOREIGN PATENT DOCUMENTS

| | | |
|---|---|---|
| CN | 107516005 A | 12/2017 |
| WO | 2005038648 A1 | 4/2005 |

(Continued)

OTHER PUBLICATIONS

Sabraoui et al, "GUI Code Generation for Android Applications Using a MDA Approach", IEEE, pp. 1-6 (Year: 2012).*

(Continued)

*Primary Examiner* — Anil Khatri
(74) *Attorney, Agent, or Firm* — Kilpatrick Townsend & Stockton LLP

(57) ABSTRACT

Techniques are disclosed for automating GUI development from a GUI screen image that includes text information and one or more graphic user interface components. The GUI screen image is analyzed to extract text information and to identify the UI components included in the GUI screen. One or more text regions in the GUI screen image are detected and are replaced with placeholders. Images of one or more graphic user interface components in the GUI screen are extracted from the GUI screen image and are classified using a machine learning-based classifier. A GUI model is generated for the GUI based upon the classification results, locations of the one or more text regions, and locations of the one or more graphic user interface components. The generated model can then be used to generate one or more implementations (e.g., executable code) of the GUI, possibly for various platforms in different programming languages.

19 Claims, 19 Drawing Sheets

(51) Int. Cl.

| | | |
|---|---|---|
| G06F 8/34 | (2018.01) | |
| G06K 9/62 | (2006.01) | |
| G06F 8/35 | (2018.01) | |
| G06K 9/46 | (2006.01) | |
| G06K 9/38 | (2006.01) | |
| G06T 7/70 | (2017.01) | |
| G06N 20/00 | (2019.01) | |

(52) U.S. Cl.
CPC ......... *G06K 9/4647* (2013.01); *G06K 9/6218* (2013.01); *G06K 9/6257* (2013.01); *G06K 9/6269* (2013.01); *G06N 20/00* (2019.01); *G06T 7/70* (2017.01); *G06K 2209/01* (2013.01)

(58) Field of Classification Search
USPC .................................................. 717/105–113
See application file for complete search history.

(56) References Cited

U.S. PATENT DOCUMENTS

| | | | | |
|---|---|---|---|---|
| 5,973,696 | A * | 10/1999 | Agranat | G06F 8/34 715/760 |
| 6,434,598 | B1 * | 8/2002 | Gish | G06F 8/24 709/201 |
| 6,496,202 | B1 * | 12/2002 | Prinzing | G06F 8/38 715/762 |
| 7,100,118 | B1 * | 8/2006 | Klask | G06F 9/451 715/764 |
| 7,146,347 | B1 * | 12/2006 | Vazquez | G06F 8/34 706/12 |
| 7,334,216 | B2 | 2/2008 | Molina-moreno et al. | |
| 7,392,162 | B1 * | 6/2008 | Srinivasan | G06F 8/10 345/473 |
| 7,620,885 | B2 * | 11/2009 | Moulckers | G06F 8/34 715/201 |
| 7,702,417 | B2 * | 4/2010 | Ravish | G05B 19/409 700/182 |
| 7,861,217 | B2 * | 12/2010 | Ciolfi | G06F 17/5009 717/104 |
| 8,006,224 | B2 * | 8/2011 | Bateman | G06F 8/34 717/100 |
| 8,015,541 | B1 * | 9/2011 | Srinivasan | G06F 8/20 717/104 |
| 8,306,255 | B1 | 11/2012 | Degnan | |
| 8,484,626 | B2 | 7/2013 | Nagulu et al. | |
| 8,762,873 | B2 | 6/2014 | Pnueli et al. | |
| 8,943,468 | B2 | 1/2015 | Balasubramanian | |
| 9,135,151 | B2 | 9/2015 | Betak et al. | |
| 9,170,778 | B2 | 10/2015 | Ivmark et al. | |
| 9,195,572 | B2 | 11/2015 | Rossi | |
| 9,261,950 | B2 * | 2/2016 | Gu | G06F 3/01 |
| 9,323,418 | B2 * | 4/2016 | DiVita | G06F 3/0481 |
| 9,338,063 | B2 | 5/2016 | Ligman et al. | |
| 9,430,141 | B1 | 8/2016 | Lu et al. | |
| 9,459,780 | B1 * | 10/2016 | Smith | G06F 9/453 |
| 9,619,209 | B1 | 4/2017 | Allen et al. | |
| 9,665,350 | B1 * | 5/2017 | Kalmar | H04L 1/244 |
| 10,255,085 | B1 * | 4/2019 | Valsaraj | G06F 9/453 |
| 2002/0169658 | A1 * | 11/2002 | Adler | G06Q 10/06 705/7.28 |
| 2010/0115434 | A1 | 5/2010 | Yagi et al. | |
| 2010/0131916 | A1 * | 5/2010 | Prigge | G06F 8/10 717/104 |
| 2011/0035345 | A1 | 2/2011 | Duan et al. | |
| 2011/0047488 | A1 | 2/2011 | Butin et al. | |
| 2011/0099499 | A1 | 4/2011 | Pnueli et al. | |
| 2011/0214107 | A1 | 9/2011 | Barmeir et al. | |
| 2012/0166978 | A1 | 6/2012 | Singh et al. | |
| 2013/0254686 | A1 | 9/2013 | Sun | |
| 2014/0068553 | A1 | 3/2014 | Balasubramanian | |
| 2014/0098209 | A1 | 4/2014 | Neff | |
| 2014/0282217 | A1 | 9/2014 | Musa et al. | |
| 2015/0020006 | A1 | 1/2015 | Kotzer | |
| 2015/0046783 | A1 | 2/2015 | O'Donoghue et al. | |
| 2016/0034441 | A1 | 2/2016 | Nguyen et al. | |
| 2016/0035303 | A1 | 2/2016 | Kim | |
| 2016/0239186 | A1 | 8/2016 | Skripkin | |
| 2016/0353030 | A1 | 12/2016 | Gao et al. | |
| 2017/0060368 | A1 | 3/2017 | Kochura | |
| 2017/0277518 | A1 | 9/2017 | Krishnan et al. | |
| 2018/0203571 | A1 | 7/2018 | Dayanandan | |
| 2018/0203674 | A1 | 7/2018 | Dayanandan | |
| 2018/0349730 | A1 | 12/2018 | Dixon et al. | |

FOREIGN PATENT DOCUMENTS

| | | |
|---|---|---|
| WO | 2012162686 A1 | 11/2012 |
| WO | 2016162678 A1 | 10/2016 |

OTHER PUBLICATIONS

Rathod, "Automatic Code Generation with Business Logic by Capturing Attributes from User Interface via XML", IEEE, pp. 1480-1484 (Year: 2016).*

Khaddam et al, "Towards Task-Based Linguistic Modeling for designing GUIs", ACM, pp. 1-10 (Year: 2015).*

Herault et al, "Sparse Probabilistic Classifiers", ACM, pp. 337-344 (Year: 2007).*

Huang et al, "A Learning-Based Contrarian Trading Strategy via a Dual-Classifier Model", ACM, pp. 1-20 (Year: 2011).*

Storrle, Model Driven Development of User Interface Prototypes: An Integrated Approach, ACM, pp. 261-268 (Year: 2010).*

Programming Graphical User Interface (GUI), GUI Programming—Java Programming Tutorial, available online at http://www3.ntu.edu.sg/home/ehchua/programming/java/j4a_gui.html (retrieved Mar. 22, 2016), Mar. 2014 (last modified), 47 pages.

Da Cruz et al., Automatic Generation of User Interface Models and Prototypes from Domain and Use Case Models, User Interfaces, available online at https://pdfs.semanticscholar.org/145d/356469c4cbbe76377c7b12a18715c018e5f7.pdf, Source: User Interfaces book edited by Rita Matrai, May 2010, INTECH, Croatia, 26 pages.

Nguyen et al., Reverse Engineering Mobile Application User Interfaces With REMAUI, available online at http://ranger.uta.edu/~csallner/papers/nguyen15reverse.pdf, In Proc. 30$^{th}$ IEEE/ACM International Conference on Automated Software Engineering (ASE), Nov. 2015 (Nov. 9-13), pp. 248-259, 12 pages.

Tsai et al., Generating user interface for mobile phone devices using template-based approach and generic software framework, Journal of Information Science and Engineering vol. 23, No. 4, Jul. 2007, pp. 1189-1211.

Yeh et al., Sikuli—Using GUI Screenshots for Search and Automation, available online at http://up.csail.mit.edu/projects/sikuli/sikuli-uist2009.pdf, UIST'09, Oct. 4-7, 2009, Victoria, British Columbia, Canada, Copyright 2009, 10 pages.

UX Wireframing & Prototyping, Sendinthefox, Mobile Experience Designer, Retrieved from http://www.sendinthefox.com/mobile-ux-wireframes-prototyping/ on Feb. 24, 2018, Copyright 2018, 10 pages.

Larsen, From Sketches to Functional Prototypes: Extending WireframeSketcher with Prototype Generation, Master of Science in Informatics, Norwegian University of Science and Technology, Department of Computer and Information Science, Dec. 2014 (submission date), 115 pages.

How to Create a Wireframe for Desktop Application, Visual Paradigm Community Circle, retrieved from https://circle.visual-paradigm.com/docs/user-experience-design/wireframe/how-to-create-a-wireframe-for-desktop-application/ on Feb. 24, 2018, Copyright 2018, Updated on Dec. 22, 2017, 42 pages.

SASH(s) Visual Designer, Wireframes | Use, A Reference for User Experience and Interaction Design Beginners, retrieved from http://www.sashsingh.com/wireframes-i-use/ on Feb. 24, 2018, 13 pages.

GitHub-tonybeltramelli/pix2code: pix2code: Generating Code from a Graphical User Interface Screenshot, https://github.com/tonybeltramelli/pix2code, (retrieved Nov. 30, 2017), pp. 1-4.

(56) References Cited

OTHER PUBLICATIONS

Miller, This Startup Uses Machine Learning To Turn UI Designs Into Raw Code, https://www.fastcodesign.com/90127911/this-startup-uses-machine-learning-to-turn-ui-designs-into-raw-code, Jun. 2, 2017, (retrieved Nov. 30, 2017), 3 pages.
Kobielus, Machine Learning Will Do Auto-Programming's Heavy Lifting, DATAVERSITY, data governance Winter Conference, Dec. 4-8, 2017, http://www.dataversity.net/machine-learning-will-auto-programmings-heavy-lifting/, Jun. 26, 2017, 2 pages.
No More Coding, Aricent, Development Agility, The Augmented Programmer, https://www.aricent.com/articles/no-more-coding, Jun. 30, 2017, 3 pages.
Mou et al., On End-to-End Program Generation from User Intention by Deep Neural Networks, Software Institute, School of EECS, Peking University, Beijing 100871, P.R. China, Oct. 25, 2015, 4 pages.
Das et al., Contextual Code Completion Using Machine Learning, 2015, 6 pages.
Buttons—UI Controls, iOS Human Interface Guidelines, available online at https://developer.apple.com/ios/human-interface-guidelines/ui-controls/buttons/, (retrieved Jun. 1, 2017), 2017, 2 pages.
Common Interfaces of Feature Detectors, OpenCV 2.4.13.2 documentation, 2011-2014, (retrieved Jun. 1, 2017), 11 pages.
iOS Human Interface Guidelines: iOS App Anatomy, developer.apple.com, Apple Inc., Copyright 2014, Updated Oct. 20, 2014, 2 pages.
iOS Human Interface Guidelines, iOS Design Themes, Oct. 20, 2017, 3 pages.
How to create an app for free: easy app maker Appy Pie best app builder, available online at http://www.appypie.com/, 2017, 10 pages.
Master Detail, Oracle Alta UI, available online at http://www.oracle.com/webfolder/ux/mobile/pattern/masterdetail.html, 2017, 15 pages.
Mobile app for ios, SAP Business One Version 1.11.x, Q1 2017, 17 pages.
Mobile-Persistence, Github Inc., available online at https://github.com/oracle/mobile-persistence, 2017, 1 page.
Navigation, Patterns—Material design guidelines, available online at https://material.io/guidelines/patterns/navigation.html, (retrieved Jan. 19, 2018), 30 pages.
Code Conventions for the Java Programming Language: 9. Naming Conventions, Oracle Technology Network, Copyright 1999, Sun Microsystems, Inc., available online at http://www.oracle.com/technetwork/java/index.html, (retrieved Oct. 20, 2017), 2 pages.
Java Code Conventions, Sun Microsystems, Inc., Sep. 12, 1997, Copyright 1997, 24 pages.
Ramer-Douglas-Peucker algorithm, Wikipedia, available online at https://en.wikipedia.org/wiki/Ramer%E2%80%93Douglas%E2%80%93Peucker_algorithm, 2017, 4 pages.
Sales Cloud (@salescloud), Twitter, available online at https://twitter.com/salescloud, 2017, 10 pages.
Canny, A Computational Approach To Edge Detection, IEEE Transactions on Pattern Analysis and Machine Intelligence, vol. PAMI-8, No. 6, 1986, 20 pages.
Del Corro et al., ClausIE: Clause-Based Open Information Extraction, International World Wide Web Conference Committee (IW3C2), Jan. 13, 2013, 11 pages.
Enslen et al., Mining Source Code to Automatically Split Identifiers for Software Analysis, International Working Conference on Mining Software Repositories, 2009, 10 pages.
Fader et al., Identifying Relations for Open Information Extraction, proceedings of the 2011 Conference on Empirical methods in Natural Language Processing, Jul. 27-31, 2011, pp. 1535-1545.
Forssen, Maximally stable colour regions for recognition and matching, IEEE Conference on Computer Vision and Pattern Recognition, Jun. 17-22, 2007, 8 pages.
Khambati et al., Model-driven Development of Mobile Personal Health Care Applications, 23rd IEEE/ACM International Conference on Automated Software Engineering, Sep. 15-19, 2008, 4 pages.
Otsu, A Threshold Selection Method from Gray-Level Histograms, IEEE Transactions on Systems, Man, and Cybernetics, vol. 9, Issue 1, Jan. 1979, pp. 62-66.
Pilehvar et al., Align, Disambiguate and Walk: A Unified Approach for Measuring Semantic Similarity, Proceedings of the 51st Annual Meeting of the Association for Computational Linguistics, Aug. 4-9, 2013, pp. 1341-1351.
The 6 Principles of Design, Visually, Inc., http://visually/6-principles-design, Oct. 23, 2017, pp. 1-8.
Lu et al., Discovering Interacting Artifacts from ERP Systems (Extended Version) 2015, 62 pages.
Barnett et al., Bootstrapping Mobile App Development, In Proceedings of the 37th IEEE International Conference on Software Engineering—vol. 2 (ICSE '15), vol. 2 IEEE Press, Piscataway, NJ, USA, 2015, pp. 657-660.
Building a complex Universal Windows Platform (UWP) app; UWP app developer, Microsoft Docs, Feb. 8, 2017, pp. 1-17.
Ling, Decision Marking Transition for MauKerja.my, Dribbble, https://dribbble.com/shots/2066972-Decision-Making-Transition-for-MauKerja-my, Oct. 23, 2017, Copyright-2017, pp. 1-5.
Response web design, https://in.pinterest.com/explore/responsive-web-design/, Oct. 23, 2017, 8 pages.
Bassett, Oracle® Cloud, Using Mobile Application Accelerator, 17.3.5, E88951-01, Sep. 2017, 164 pages.
Savva et al., ReVision: Automated Classification, Analysis and Redesign of Chart Images, In Proceedings of the 24th annual ACM symposium on User interface software and technology, UIST'11, Oct. 16-19, 2011, 10 pages.
Stanford CoreNLP—Natural Language Software, CoreNLP version 3.8.0, https://stanfordnlp.github.io/CoreNLP/, Jan. 23, 2018, 6 pages.
Alphabetical List of Part-of Speech Tags Used in the Penn Treebank Project, Penn Treebank P.O.S. Tags, https://www.ling.upenn.edu/courses/Fall_2003/ling001/penn_treebank_pos.html, Jan. 23, 2018, 2 pages.
Schramm et al., Rapid UI Development for Enterprise Applications: Combining Manual and Model-Driven Techniques, SAP Research Center Dresden, D.C. Petriu, N. Rouquette, Ø. Haugen (Eds.): Model Driven Engineering Languages and Systems, MODELS 2010, Part I, Lecture Notes in Computer Science vol. 6394, 2010, pp. 271-285, Springer, Berlin, Heidelberg.
Transcript and associated screen shots for YouTube video "MCS:89. Mobile Application Accelerator (MAX) Demo", Oracle Mobile, by Grant Ronald, published on May 9, 2016 (total length of video: 12:26) 29 pages.
Transcript and associated screen shots for YouTube video "How to Customize the Oracle Sales Mobile App" Demo Video Library, App Composer #44, Oracle, Fusion Applications Release 8, published on Oct. 15, 2014 (total length of video: 1:38) 5 pages.
Transcript and associated screen shots for YouTube video, "An Overview of Application Composer" Demo Video Library, Application Composer #68, Oracle. Fusion Application Release 11, published on Apr. 26, 2016 (total length of video: 5:28) 13 pages.
Suzuki et al., Topological Structural Analysis of Digitized Binary Images by Border Following. Computer Vision, Graphics, and Image Processing 30, 1985, pp. 32-46.
How to convert iOS UI to Android, Retrieved from http://androidux.com/work/beginner-guide/, Oct. 23, 2017, 16 Pages.
Pleuss et al., Model-driven Development and Evolution of Customized User Interfaces, VaMoS '13 Proceedings of the Seventh International Workshop on Variability Modelling of Software-intensive Systems; Article 18, 2013, 10 pages.
Beckley, Android Design Guidelines, mutualmobile, Version 1, Feb. 2011, 31 pages.
Structure-Layout-Material Design, UI regions, retrieved from https://material.io/guidelines/layout/structure.html on Jan. 19, 2018, 24 pages.
U.S. Appl. No. 15/801,890, "Non-Final Office Action", dated Jan. 22, 2019, 24 pages.
International Patent Application No. PCT/US2018/041038, International Search Report and Written Opinion dated Oct. 29, 2018, 11 pages.
U.S. Appl. No. 15/613,122, Non-Final Office Action dated Aug. 30, 2019, 36 pages.

(56) References Cited

OTHER PUBLICATIONS

Wu et al., "Recursive Algorithms for Image Segmentation Based on a Discriminant Criterion", World Academy of Science, Engineering and Technology, vol. 1 Retrieved online: https://www.semanticscholar.org/paper/Recursive-Algorithms-for-Image-Segmentation-Based-a-Wu-Chen/9c7cce1c0407427bf86a3b1bfada97ba49a9c13a, 2007, 6 pages.

* cited by examiner

```
{
    "ui_data": [                                                1300
        {
            "rows": [
                {
                    "background": "#ffffff",
                    "column": [
                        [
                            {
                                "component_type": "label",
                                "label": " Details",
                                "text_within_component": null
                            }
                        ],
                        [
                            {
                                "component_type": "image",
                                "image_name": "face11.jpg",
                                "label": null,
                                "text_within_component": null
                            },
                            {
                                "component_type": "label",
                                "label": " Change Photo",
                                "text_within_component": null
                            }
                        ],
                        [
                            {
                                "component_type": "label",
                                "label": " First Name*",
                                "text_within_component": null
                            },
                            {
                                "component_type": "inputtext",
                                "label": null,
                                "text_within_component": " Lynn"
                            },
                            {
                                "component_type": "label",
                                "label": " Mobile",
                                "text_within_component": null
                            },
                            {
                                "component_type": "inputtext",
                                "label": null,
                                "text_within_component": " 650-555-1212"
                            }
                        ],
                        ..........
                    ],
                    "height": 80,
                    "row": 0,
                    "width": 80
                }
            ],
            "section": 0
        }
    ]
}
```

FIG. 13

Details

Change Photo

| | | | |
|---|---|---|---|
| First Name* | Lynn | Mobile | 650-555-1212 |
| Last Name* | Smith | Phone* | 650-555-1213 |
| Address* | 14 Water Street | Email* | lynn.smith@fixitfast.com |
| City* | Burlingame | | |
| State | CA ▼ | | |

Details

Change Photo

| | | | |
|---|---|---|---|
| First Name* | Lynn | Mobile | 650-555-1212 |
| Last Name* | Smith | Phone* | 650-555-1213 |
| Address* | 14 Waterstreet | Email* | lynn.smith@fixitfast.com |
| City* | Burlingame | | |
| State | CA ▼ | | |

AUTOMATED CODE GENERATION

CROSS-REFERENCE TO RELATED APPLICATIONS

The present application claims the benefit of and priority to Indian Provisional Patent application Number 201841005130, filed on Feb. 12, 2018, entitled "AUTOMATED CODE GENERATION," the entire content of which is herein incorporated by reference for all purposes.

BACKGROUND

In a typical graphic user interface (GUI) development process, the GUI may be designed by a designer based upon customer or client surveys, marketing surveys, and other sources of information that drive the functionalities and appearance to be included in the GUI to be developed. The GUI may describe an application's desired user interface (UI), such as mockup images of various screens for the application, the design and look-and-feel of the screens, transitions between screens, and the like. In addition to mockup images of the screens, the GUI may also include text content that provides information regarding the GUI to the users.

The GUI (including images of GUI screens) for an application may be documented in a document (e.g., a design document) or specification (e.g., an image file or a schematic sketch) by a designer. The GUI design document may then be used to create or develop the code for implementing the GUI for the application. For example, during a development phase, the GUI design document, comprising one or more images or sketches of the GUI screens for the application, may be provided to an engineering organization comprising engineers or developers who are tasked with writing code for implementing the GUI and/or the application based upon the GUI design document. These developers may manually write the code or may use a "Drag n Drop" based development tool to manually build the desired GUI screens and generate code that implements the GUI with the desired appearance and functionalities described in the GUI design document.

Thus, the development of a GUI for an executable application from a design document may involve substantial manual effort by the developers. It may require the developers to study the design document, understand the requirements including the desired functionalities and appearance of the GUI screens, and then write code to implement the GUI and/or the application. It may also require the developers to have knowledge about the application development platform and programming language to be used for developing the GUI and also have knowledge about the specific target system or platform (e.g., iOS® or Android®, mobile or desktop) for which the GUI and the application are to be developed. As a result, quite often, developers with specific expertise are needed for the GUI development. All these factors cause the development phase to be tedious, time consuming, labor-intensive, and expensive.

BRIEF SUMMARY

The present disclosure relates to application development, and more particularly, to techniques for automating the development of a graphic user interface (GUI) for an application from design documents, such as one or more images or sketches for one or more GUI screens of the application. Various inventive embodiments are described herein, including methods, systems, non-transitory computer-readable storage media storing programs, code, or instructions executable by one or more processors, and the like.

In certain embodiments, the GUI for an application may include one or more GUI screens, with each screen including one or more user interface (UI) components, such as buttons, text entry boxes, drop-down lists, drop-down menus, icons, tables, and the like. In addition to the UI components, a GUI screen may also include portions containing text content. The text content may be associated with certain UI components, for example, may describe information to be entered in a UI component, functionality of a UI component, URL links, etc.

In certain embodiments, an image of a GUI screen (also referred to as GUI screen image) designed by, for example, a GUI designer, may be analyzed to extract text information from the GUI screen image and to identify the UI components included in the GUI screen. Various machine learning-based techniques may be used for analyzing a GUI screen image. For example, the UI components may be detected and classified by a machine learning-based classifier (e.g., a support vector machine classifier or a convolutional neural network-based classifier) that is configured to, provided an input GUI screen image, identify UI components present in the screen image and the locations of the detected UI components in the image. Additionally, the learning-based classifier may be configured to identify a type for each detected UI component and/or a function associated with each detected UI component. Text content items in the GUI screen image and their corresponding locations may also be detected and recognized.

A GUI model may then be generated for the GUI for the application based upon, for example, the detected UI components, the types of the UI components, the locations of the UI components, the associated text information for the UI components, and additional text information that may not be associated with any UI component. The GUI model may be language-independent and platform-independent. The information describing the GUI for the application may include information that describes the one or more GUI screens for the application, and for each GUI screen, information about detected UI components, text portions, etc. on the GUI screen.

Various different formats may be used for storing the model generated for an application. For example, in certain embodiments, the generated model may be described in a data-interchange format that is language and/or platform independent. For example, the GUI model may be described in a data-interchange format that is language-independent, such as the JavaScript Object Notation (JSON) format. In some implementations, the GUI model may be generated as metadata that can be associated with an application.

A GUI model that is generated based upon analysis of the GUI screen images for an application can then subsequently be used to generate code that implements the GUI for the application described in the model. The code that is generated is such that when executed or interpreted generates a GUI with the look-and-feel and functionality as depicted in the design document (e.g., a design document comprising a set of images representing the GUI) describing the application GUI. The same generated model may be used for generating code in potentially different languages for various different platforms (e.g., iOS®, Android®, etc.).

As described above, an image representing a GUI screen may be analyzed to detect one or more text content items and UI components present in the image. In some embodiments, before classifying a UI component, text content items may be extracted from the image of the UI component and may be replaced with a placeholder that does not include any text content. In some embodiments, a histogram may be generated based on pixels in a portion of the image that includes a text content item. The histogram may be used to determine whether an intensity of the text content item is lighter than an intensity of the background. The pixels in the portion of the image may then be inverted to cause the text content item in the portion of the image to be darker than the background in the portion of the image. The text content item may then be recognized based on the inverted portion of the image. In some embodiments, the text content item in the portion of the image may be replaced with a pixel array having a pre-defined pattern of pixels or having pixel values of the background of the portion of the image. This pixel array replacement not only causes the actual text content to be removed from the image portion but also identifies the location and boundaries of the text content within the image. In some embodiments, the pre-defined pattern of pixels may facilitate the determination of the location of the text content item and/or the type of the UI component.

In certain embodiments, the GUI model generated for a GUI for an application may encapsulate information corresponding to the one or more GUI screens for the application. For each GUI screen, the GUI model may include information identifying one or more user interface (UI) components included in the GUI screen. For each GUI screen, the model may also include information about the structure of the GUI screen, such as information identifying a hierarchical organization of the user interface components and text content items on the GUI screen. For example, in some embodiments, UI components may be grouped based on, for example, the types and locations of the UI components, to form subgroups of UI components (e.g., a table or a list). The subgroups may be further clustered to determine a higher level layout of the GUI screen. In some embodiments, text content items may also be grouped to form, for example, a line of text or a paragraph of text. In some embodiments, text content items may be grouped or associated with UI components based on, for example, location information of the text content items and UI components.

In certain embodiments, an image of a GUI screen may be analyzed to identify portions of the image comprising text content items and UI components. Depending upon the location and nature of a text content item, the text content item may be determined to be associated with an UI component detected on the screen, or else, in certain embodiments, the text content item may be determined to be standalone and not associated with any detected UI component. The GUI model that is generated encapsulates this information. In some embodiments, the GUI model may thus indicate certain text content items as being standalone and not being associated with any UI component. In certain embodiments, a non-associated text content item may be detected and classified to be clickable text (e.g., a link) that can initiate an action when clicked. This information may be stored in the GUI model.

In some embodiments, a GUI model may describe how various UI components of a GUI screen are to be displayed such that the look-and-feel of the GUI screen as designed can be reproduced. In certain embodiments, the GUI model may also include information about the functions to be associated with certain UI components on the GUI screens. The functions associated with a user interface components may be determined based on, for example, the types of the user interface component as classified by the machine learning-based classifier, and/or the associated text content items (if any).

In some embodiments, an infrastructure is provided that enables a user(s) to edit and provide feedback on the generated GUI model. The user feedback may include, for example, a correction to be made to a portion of the automatically generated model (e.g., changing a type associated with an UI component). The feedback may also include the user providing additional information that is added to the model. The user feedback may then be used to improve (e.g., retrain) the machine learning based classifier.

A GUI model generated for a GUI based upon the GUI design information can be used by various downstream consumers. For example, a downstream consumer may use the model to, automatically and substantially free of any manual coding, generate code for implementing the GUI. The code may be an executable program executable by one or more processors or an interpretable program that can be interpreted by, for example, a web browser, to display a GUI having a look-and-feel and/or functionality that is substantially similar to the desired look-and-feel and/or functionality depicted in the set of images that were used to generate the GUI model. The same GUI model can be used by different consumers. For example, a first consumer may use the GUI model for automatically generating an executable for a first platform (e.g., iOS®) and a second consumer may use the same GUI model to automatically generate a second executable for a different platform (e.g., Android®). The GUI model (e.g., in JSON format) can also be used to generate code in different programming languages, such as markup languages (e.g., HTML or XML) or stylesheet languages (e.g., cascading style sheet (CSS)).

According to certain embodiments, a computer-implemented method may include detecting, from an input image, a graphic user interface (GUI) screen image depicting a GUI screen of a GUI; detecting a first region of the GUI screen image that includes a first text content item; determining a location of the first region within the GUI screen image; and replacing the first region with a placeholder that does not include text content. The computer-implemented method may further include detecting a first user interface (UI) component located in a second region of the GUI screen image, where the second region includes the first region with the placeholder; determining a location of the first UI component within the GUI screen image; and determining a UI component type for the first UI component using a machine learning-based classifier. The machine learning-based classifier may be trained using training data including a plurality of training images, where each training image in the plurality of training images may include a UI component. The training data may further include, for each training image, information identifying a UI component type for the UI component in the training image. A GUI model that is usable for generating code for implementing the GUI may then be generated. The GUI model may include information for the first UI component and information for the first text content item, where the information for the first UI component may include information indicative of the UI component type determined for the first UI component and the location of the first UI component within the GUI screen image.

In some embodiments of the method, detecting the first UI component may include detecting the first UI component in the GUI screen image by the machine learning-based classifier, and the training data may further include, for each training image, a location of a UI component within the training image. In some embodiments, the method may further include grouping the first text content item with the first UI component based upon the location of the first region within the GUI screen image and the location of the first UI component within the GUI screen image, where generating the GUI model may further comprise including information indicative of the grouping in the GUI model.

In some embodiments, the computer-implemented method may further include detecting a third region of the GUI screen image that may include a second text content item; determining a location of the third region within the GUI screen image; detecting a location of a second UI component located in the GUI screen image; determining a location of the second UI component within the GUI screen image; and determining a UI component type for the second UI component using the machine learning-based classifier. The computer-implemented method may further include grouping the first text content item, the second text content item, the first UI component, and the second UI component based upon the location of the first region, the location of the third region, the UI component type and location of the first UI component, and the UI component type and location of the second UI component; and determining a layout of the GUI screen based upon the grouping, where generating the GUI model may further comprise including information indicative of the grouping and the layout of the GUI screen in the GUI model.

In some embodiments, the computer-implemented method may further include determining, based upon the location of the third region within the GUI screen image, that the second text content item is not associated with any UI component in the GUI screen image; and determining that the second text content item is indicative of an action, where generating the GUI model may include indicating in the GUI model that the second text content item within the third region of the GUI screen image is clickable text, where clicking of the second text content item may initiate the action.

In some embodiments, the first region may include the first text content item on a background. The computer-implemented method may further include generating a histogram based on intensity values of pixels in the first region of the GUI screen image; determining from the histogram that intensity values of pixels for the first text content item are higher than intensity values of pixels of the background based upon a number of pixels corresponding to the first text content item and a number of pixels corresponding to the background in the first region of the GUI screen image; inverting the intensity values of the pixels in the first region, where the inverting can cause the intensity values of the pixels for the first text content item to be lower than the intensity values of the pixels of the background in the first region; and recognizing the first text content item in the first region after performing the inverting. In some embodiments, the method may further include converting, before generating the histogram, the first region of the GUI screen image from an RGB sub-image to a binary sub-image based upon an intensity value of each pixel in the first region.

In some embodiments of the method, the placeholder may include a pre-defined pattern of pixels, and determining the UI component type for the first UI component may include classifying the second region of the GUI screen image based upon presence of the placeholder in the second region and the pre-defined pattern of pixels in the placeholder. In some embodiments, the placeholder may include a pre-defined pattern of pixels enabling boundaries of the location of the first text content item in the first region to be determined from the GUI screen image. In some embodiments, pixel values of the pre-defined pattern of pixels may include a pre-defined value or a pixel value of a pixel in a background of the first region.

In some embodiments, generating the GUI model may include storing information of the GUI model in a JavaScript Object Notation (JSON) format. In some embodiments, the method may further include generating one or more implementations of the GUI based upon the GUI model. In some embodiments, generating the one or more implementations of the GUI based upon the GUI model may include generating a first implementation of the GUI for a first platform using the GUI model, and generating a second implementation of the GUI for a second platform using the GUI model, where the second platform is different from the first platform. In some embodiments, generating the one or more implementations of the GUI based upon the GUI model may include generating a first implementation of the GUI in a first programming language using the GUI model, and generating a second implementation of the GUI in a second programming language using the GUI model, where the second programming language is different from the first programming language. In some embodiments, generating the one or more implementations of the GUI based upon the GUI model may include generating the one or more implementations of the GUI using the GUI model and one or more code generation templates, where each code generation template is associated with a platform or a programming language.

In some embodiments, the machine learning-based classifier may include an image histogram-based nonlinear support vector machine classifier or an artificial neural network-based classifier. In some embodiments, the method may further include receiving user feedback on the GUI model, where the user feedback may include information identifying a new UI component type to be associated with the first UI component instead of the UI component type specified for the first UI component in the GUI model, or information identifying a new UI component present in the GUI screen but not included in the GUI model and information indicating a UI component type for the new UI component. The method may further include retraining the machine learning-based classifier based upon the user feedback.

In some embodiments, the user feedback may include a sub-image of the first UI component or the new UI component. The method may further include extracting features from the plurality of training images; mapping the features extracted from the plurality of training images to data points in a multi-dimensional space, where the data points may form a set of clusters in the multi-dimensional space; extracting features from the sub-image of the first UI component or the new UI component; mapping the features extracted from the sub-image of the first UI component or the new UI component to a data point in the multi-dimensional space; determining a distance between the data point corresponding to the sub-image of the first UI component or the new UI component and a center of each cluster of the set of clusters; and, in response to determining that the distance is less than a threshold value, including the sub-image of the first UI component or the new UI component in the training data.

According to certain embodiments, a non-transitory computer readable medium may store a plurality of instructions executable by one or more processors, where the plurality of instructions, when executed by the one or more processors, may cause the one or more processors to perform the methods described above.

According to certain embodiments, a system may include one or more processors and a memory coupled to the one or more processors. The memory may store instructions, which, when executed by the one or more processors, may cause the system to perform the methods described above.

The foregoing, together with other features and embodiments will become more apparent upon referring to the following specification, claims, and accompanying drawings.

BRIEF DESCRIPTION OF THE DRAWINGS

FIG. 13 depicts an example of a GUI model in JSON format generated for a GUI screen according to certain embodiments.

DETAILED DESCRIPTION

Figure 1:
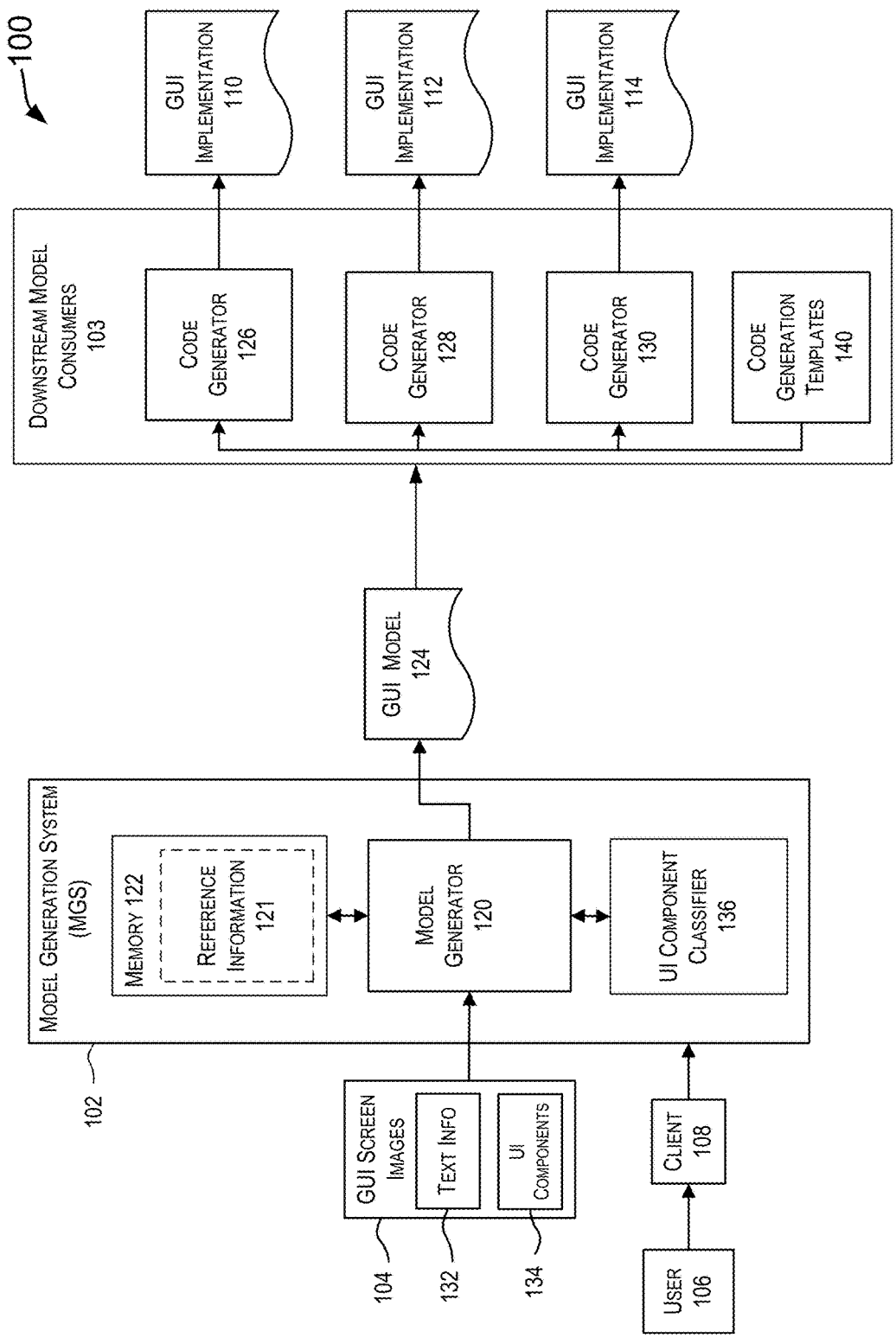
FIG. 1 depicts a simplified high level diagram of an example of a system for generating a graphic user interface (GUI) model for a GUI based upon design information for the GUI according to certain embodiments, where the generated GUI model can be used by downstream consumers to automatically generate one or more implementations of the GUI.

The present disclosure generally relates to application development, and more particularly, to techniques for automating the development of a graphic user interface (GUI) for an application from design information for the GUI. Various inventive embodiments are described herein, including methods, systems, non-transitory computer-readable storage media storing programs, code, or instructions executable by one or more processors, and the like.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

In certain embodiments, the GUI for the application may include one or more GUI screens, with each screen including one or more user interface (UI) components, such as buttons, text entry boxes, drop-down lists, drop-down menus, icons, tables, and the like. The GUI for the application may also include text information describing the application's GUI and/or the functionality and behavior associated with various UI components or providing other information or instructions to the user.

In certain embodiments, an image of a GUI screen (also referred to as a GUI screen image) designed by a GUI designer may be analyzed to extract text information and identify UI components. For example, the UI components may be detected and classified by a machine learning-based classifier (e.g., a support vector machine classifier or a convolutional neural network-based classifier) to identify the type and/or associated function of each UI component. The corresponding locations of the text information and the UI components may be determined from the GUI screen image as well. A layout of the GUI screen may be determined based on certain attributes of the text information and the UI components. A language-independent GUI model may then be generated for the GUI screen based upon, for example, the identified UI components, the types of the UI components, the locations of the UI components, the associated text information for the UI components, additional text information that may not be associated with any UI component, and the layout of the GUI screen. The generated model may be described in a data-interchange format and can subsequently be used to generate code that implements the GUI screen on various platforms using various programming languages. In some embodiments, executable or interpretable code may be generated based upon the GUI model to display a GUI that has the same look and feel and functionality as described in the design information for the GUI.

In some embodiments, before detecting or classifying a UI component, text content in the GUI screen image may be extracted and replaced with a placeholder that does not include any text content. For example, in some embodiments, a histogram may be generated based on intensity values of pixels in a portion of the GUI screen image that includes a text content item. The histogram may be used to determine whether the color of the text content item is lighter than the color of the background. The pixels in the portion of the GUI screen image may then be inverted to cause the color of the text content in the portion of the GUI screen image to be darker than the color of the background in the portion of the GUI screen image. The text content item may then be recognized from the inverted portion of the GUI screen image. In some embodiments, the text content in the portion of the GUI screen image may be replaced with a pixel array having a pre-defined pattern of pixels or having pixel values of the background of the portion of the GUI screen image. In some embodiments, the pre-defined pattern of pixel may facilitate the determination of the location of the text content item and/or the type of the UI component associated with a text content item.

In certain embodiments, the GUI model generated for a GUI may encapsulate information corresponding to the one or more GUI screens for the application. For each GUI screen, the GUI model may include information identifying one or more user interface (UI) components included in the GUI screen. For each GUI screen, the model may also include information about the structure of the GUI screen, such as information identifying a hierarchical organization of the user interface components in the GUI screen. For example, in some embodiments, UI components may be grouped based on, for example, the types and locations of the UI components, to form subgroups of UI components (e.g., a table or a list). The subgroups may be further clustered to determine a higher level layout of the GUI screen. In some embodiments, text content items may also be grouped to form, for example, a line of text or a paragraph of text. In some embodiments, text content items may be grouped or associated with UI components based on, for example, location information of the text content items and UI components.

In some embodiments, the GUI model may indicate certain text content items not associated with any UI component as clickable text that can initiate an action when clicked. In some embodiments, the GUI model may describe how various UI components of the GUI screen are to be displayed such that the look-and-feel of the GUI screen as designed may be reproduced. In certain embodiments, the GUI model may also include information about the functions to be associated with the user interface components on the GUI screens. The functions associated with the user interface components may be determined based on, for example, the types of the user interface components classified by the machine learning-based classifier, and/or the associated text content items (if any). In some implementations, the GUI model may be generated as metadata. In some implementations, the GUI model may be described in a data-interchange format that is language independent, such as the JavaScript Object Notation (JSON) format. In some embodiments, users may provide feedback on the GUI model. The user feedback may then be used to improve (e.g., retrain) the machine learning based classifier.

A GUI model generated for a GUI based upon the design information can be used by various downstream consumers. For example, a downstream consumer may use the model to, automatically and substantially free of any manual coding, generate code for implementing the GUI. The code may be an executable program executable by one or more processors or an interpretable program that can be interpreted by, for example, a web browser, to display the GUI. The same GUI model can be used by different consumers. For example, a first consumer may use the GUI model to automatically generate an executable for a first platform (e.g., iOS®) and a second consumer may use the same GUI model to automatically generate a second executable for a different platform (e.g., Android®). The GUI model (e.g., in JSON format) can also be used to generate code in different programming languages, such as markup languages (e.g., HTML or XML) or stylesheet languages (e.g., cascading style sheet (CSS)).

As used herein, a UI component may refer to a graphical component of a GUI screen. The UI components may include different types of UI components, such as buttons, text entry boxes, drop-down lists, drop-down menus, check boxes, radio buttons, switch buttons, icons, tables, photos (of people or objects), line dividers, containers, and the like. A GUI screen may include one or more text regions, where each text region may include text content. The text content in each text region may include one or more text content items. As used herein, a text content item may refer to a non-graphical component of a GUI screen that includes certain textual characters in any language. For example, a text content item may include a word, a special character, or a short phrase. As used herein, a GUI component may include any element shown in a GUI screen, including a UI component or a text content items.

For purposes of explanation, certain examples are described in this disclosure. These examples are however intended to be illustrative and not restrictive. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

FIG. 1 depicts a simplified high level diagram of an example of a system 100 for generating a graphic user interface (GUI) model for a GUI based upon design information for the GUI according to certain embodiments, where the generated GUI model can be used by downstream consumers to automatically generate one or more implementations of the GUI. System 100 depicted in FIG. 1 is merely an example and is not intended to unduly limit the scope of the present disclosure. One of ordinary skill in the art would recognize many possible variations, alternatives, and modifications. For example, in some implementations, system 100 may have more or fewer subsystems or components than those shown in FIG. 1, may combine two or more subsystems, or may have a different configuration or arrangement of the subsystems.

As shown in FIG. 1, system 100 may include a model generation system (MGS) 102 that is configured to receive one or more GUI screen images 104 for a GUI as input and generate a GUI model 124 for the GUI based upon the one or more GUI screen images 104. GUI model 124 may then be consumed by one or more downstream model consumers 103, who may generate one or more GUI implementations 110, 112, and 114 of the GUI based upon GUI model 124 substantially free of manual coding. GUI implementations 110, 112, and 114 may be executable by one or more processors to display the GUI on different platforms.

As indicated above, before a GUI model or an implementation is created for a GUI, information may be defined or gathered for the GUI. One or more GUI screen images 104 may be put together based upon customer or client surveys, marketing surveys, and other sources of information that drive the look and feel of the GUI and the functionalities to be included in the GUI. One or more GUI screen images 104 may thus describe the desired look and feel and the functionalities of the GUI. Various different personnel may be involved in the preparation of GUI screen images 104, such as functional consultants, user experience (UX) designers, and the like. GUI screen images 104 may be generated using a computer aided design tool and saved in a digital format, or may be generated manually as sketches on paper and then be scanned into digital images.

In certain embodiments, such as the embodiment depicted in FIG. 1, GUI screen images 104 may include one or more images, where each image may be for one GUI screen or multiple GUI screens. In certain embodiments, GUI screen images 104 may be received as a sequence or may have an ordering, where the sequence or ordering identifies the flow between the screens depicted by the images. GUI screen images 104 may depict the design and the look and feel of the screens, transitions between screens, and the like. Each GUI screen image 104 may include one or more UI components 134 and text information 132. GUI screen images 104 may be received in one of various different formats, such as a bitmap file, a JPEG file, a PNG (Portable Network Graphics) file, a GIF file, a PDF file, and the like. Various different techniques may be used to generate GUI screen images 104. For example, GUI screen images 104 may include an image that is a photograph captured using an image capture device such as a camera, a scanner, and the like. As another example, GUI screen images 104 may include an image that is a screenshot, for example, a screenshot of a screen of an existing application, where the to-be-developed application is to have a similar GUI screen as the existing application (e.g., the existing application could be a previous version of the application for which a new version of the application is to be developed). GUI screen images 104 may also include images generated using an application such as an image editing application (e.g., various image editing applications provided by Adobe Corporation®). GUI screen images 104 may also include images generated using software applications capable of creating or editing images such as various word processors (e.g., MS WORD®), diagramming applications (e.g., Visio®), and other applications.

The application that is to be developed using GUI screen images 104 may be one of various types of applications including but not restricted to a mobile application (e.g., an application executable by a mobile device), a desktop application, a web application, an enterprise application, and the like. The application may be targeted for one of various different types of devices (e.g., smart phones, tablets, laptops, desktop computers, and the like) and platforms (e.g., iOS® platform, Android® platform, Windows® platform, and the like). For example, GUI screen images 104 may include one or more images of one or more GUI screens for a mobile application designed to execute on an Apple iPhone®, where the screens span the entirety of the mobile device's screen real estate or a portion thereof.

Each GUI screen image 104 may include one or more UI components 134, such as buttons, text entry boxes, drop-down lists, drop-down menus, check boxes, icons, tables, photos (of people or objects), and the like. In some embodiments, some UI components 134 may include an associated text. For example, a button may include a word, such as "Next," "Cancel," "Confirm," or "OK" on the button. UI components 134 may also have associated attributes, such as sizes, locations, or associated actions or functions. For example, UI components 134 may be located at any location in a GUI screen image 104. In some embodiments, UI components 134 may be arranged on a GUI screen image 104 according to a layout or a hierarchical structure, such as a table, a list, a tree structure, a flow chart, an organization chart, and the like. Some UI components 134 may be clickable, selectable, or may otherwise take user input (e.g., user entry), while some other UI components may be static or may not take any user input.

As depicted in FIG. 1, each GUI screen image 104 may include text information 132. Text information 132 may provide a textual description of the application's functionalities, including but not limited to, the look and feel of the screen (e.g., the design or structure of a screen, user interface components of a screen, fonts used, colors (e.g., foreground and background colors) used on the screen, and the like), the functionalities of the screen and its user interface components, the data to be displayed by the screen and its user interface components, and the like. Text information 132 may also include other informative materials or instructions to the users. In some embodiments, text information 132 may also describe transitions between the multiple screens.

In a traditional application development environment, an application may be manually built based upon GUI screen images 104. For example, GUI screen images 104 may be provided to an engineering organization comprising engineers or developers who are tasked with writing the code for implementing GUI screen images 104 for the application and other components of the application. These developers may need to understand GUI screen images 104 and then manually write code that implements the GUI and associated functionalities for the application as defined in GUI screen images 104.

According to certain embodiments, model generation system 102 may be configured to take GUI screen images 104 as input and automatically generate GUI model 124 using, for example, a model generator 120, a UI component classifier 136, and/or reference information 121 stored in a memory 122. GUI model 124 may then be used to automatically generate one or more implementations of the GUI. The implementations may include code and logic implementing the GUI. The implementations may include executable implementations that can be executed by one or more processors.

As shown in FIG. 1, model generation system 102 may include one or more subsystems that are configured to work together to generate GUI model 124. These subsystems may be implemented in hardware, in software (e.g., code, instructions, program) executed by one or more processing units (e.g., processors or cores) of a computer system, or combinations thereof. The software may be stored on a non-transitory storage medium (e.g., a memory device) such as memory 122. In the embodiment depicted in FIG. 1, model generation system 102 includes one model generator 120. In alternative embodiments, model generation system 102 may include multiple model generators 120.

Model generation system 102 may use various different techniques to build GUI model 124 from GUI screen images 104. For example, model generation system 102 may process and analyze GUI screen images 104 to determine one or more GUI screens specified for the GUI, and for each GUI screen, the set of user interface components included on that screen and the physical arrangement of the user interface components. In some embodiments, this GUI model generation processing may include, for example, for a GUI screen, determining a set of user interface components (e.g., buttons, drop down lists, segments, and the like) and their attributes (e.g., labels, sizes, locations), determining the physical layout of the UI components within the GUI screen (e.g., determining hierarchical containment relationships of UI components or groups of UI components), and determining functionality to be associated with one or more of the UI components.

In certain embodiments, model generation system 102 may be configured to process and analyze a GUI screen image 104 to identify one or more user interface components included in the screen using, for example, contour detection techniques that can detect the boundaries of each of the UI components. Based on the boundaries of each of the UI components, the size and location of each UI component may be determined. The image within the boundaries of each UI component may be extracted and classified using a machine learning-based classifier, such as a support vector machine classifier, a convolutional neural network-based classifier (e.g., using a Softmax classifier), or other deep neural network-based classifier. The classifier may classify the UI component into a type of UI component among many possible types of UI components, such as buttons, text entry boxes, drop-down lists, drop-down menus, check boxes, icons, tables, photos (of people or objects), and the like. Additional description and examples of processing that may be performed by model generation system 102 for determining components of the GUI screens and the layout of the GUI screens are provided below.

In certain embodiments, model generation system 102 may extract text information 132 from GUI screen images 104. For example, in some implementations of model generation system 102, a text detection tool may be used to determine the locations (e.g., coordinates) of the regions in a GUI screen image 104 that may include text content, and an optical character recognition (OCR) tool may then be used to extract (e.g., recognize) text content items from these regions in GUI screen image 104. In some embodiments, based on the size and location of each UI component and the location information of the text content items, some text content items (e.g., text on a clickable button) may be associated with certain UI components (e.g., the clickable button).

In certain embodiments, the processing performed by model generation system 102 may be guided by reference information 121 that is accessible to model generation system 102, including model generator 120 and UI component classifier 136. Reference information 121 may include various types of information. For example, in certain embodiments, reference information 121 may include various rules that guide the processing performed by model generation system 102. In certain embodiments, reference information 121 may include rules that model generation system 102 may use to determine one or more GUI screens specified for the GUI, and/or for each GUI screen, the set of user interface components included on that screen, and the physical layout of the GUI screen (e.g., rules for UI component and text content item clustering). In the embodiment depicted in FIG. 1, reference information 121 may be stored in memory 122. In some other embodiments, reference information 121 may be stored in a remote location from model generation system 102. In yet other embodiments, portions of reference information 121 may be stored in memory 122 local to model generation system 102 while other portions may be stored remotely from model generation system 102.

In certain embodiments, the processing or portions of processing performed by model generation system 102 may be performed using various machine learning techniques. For example, machine learning techniques may be used for UI component detection and classification, text detection, text content (e.g., hand-written text content) recognition, or UI component and text content item clustering. Information related to these machine learning techniques (e.g., weights of a neural network, filters for convolutional neural network, models used for machine learning, data for training the models, application of the models, feedback information for improving the model accuracy, and the like) may also be included in reference information 121. In certain embodiments, a combination of rule-based processing and machine learning-based techniques may be used by model generation system 102. Thus, reference information 121 may include rules and information related to the machine learning-based models.

In certain embodiments, reference information 121 may also include information about the various types of UI components. The information for a type of UI components may include information such as the name (or identification) of the type (e.g., button, check box, input box, and the like), the parameters (e.g., attributes, elements, or field names) for the type of UI components, the function or action, connectivity, and storage information for the type of UI components, and/or data source for the type of UI components, and the like. Model generation system 102 may use such information to describe the identified UI components and associate certain actions with the UI components in GUI model 124.

In certain embodiments, reference information 121 may be configured by a user (e.g., a programmer) or administrator of model generation system 102. In some other embodiments, reference information 121 may be built using one or more machine learning techniques. For example, reference information 121 may include one or more machine learning-based models that are built using training data and supervised machine learning techniques, where the one or more machine learning-based models may be used to generate GUI model 124.

In certain embodiments, GUI model 124 may be persisted to one or more files generated by model generator 120. GUI model 124 may be described in various formats. For example, in some implementations, GUI model 124 may be described in a data-interchange format that is language independent, such as JavaScript Object Notation (JSON) format. In certain embodiments, the model information may be encoded in a markup language such as Extensible Markup Language (XML) or jQuery. For example, model generation system 102 may generate one or more XML files that together represent GUI model 124. The generated file(s) may be stored in memory 122 or in some other memory locations accessible to model generation system 102. In certain embodiments, GUI model 124 may be passed to one or more downstream consumers, for example, code generators 126, 128, and 130, by model generation system 102 without first being persisted to a file.

GUI model 124 may then be used by one or more downstream model consumers 103. For example, model consumers 103 may be configured to generate one or more GUI implementations 110, 112, and 114 based upon GUI model 124. GUI implementations 110, 112, and 114 may each be based on information specified in GUI model 124. Since GUI model 124 is generated based upon designed GUI screen images 104, a GUI implementation generated based upon GUI model 124 may have the look and feel and the functionality as described in GUI screen images 104. For example, GUI model 124 may include information specifying a particular GUI window or screen comprising a particular set of UI components and mapped to a particular set of functions or actions. A GUI implementation (e.g., the code or instructions implementing the GUI) generated based upon GUI model 124 may include code and logic for instantiating the particular GUI screen with the particular set of UI components and mapped to the particular set of functions or actions.

Accordingly, the GUI implementations may implement GUI screens and associated actions or functions as described by GUI model 124, which in turn is generated based upon GUI screen images 104. For example, if GUI model 124 specifies a particular screen including a set of user interface components arranged in a particular physical layout, then that screen and the particular physical layout may be implemented by the GUI implementation. If the GUI model 124 specifies a particular function for a particular user interface component, then a GUI implementation generated based upon the model may include logic for implementing that particular function and associating the function with the particular user interface component. In certain embodiments, the GUI implementation may provide a hook enabling a particular user interface component to be linked with code implementing a particular function to be associated with that particular user interface component. In certain embodiments, a GUI implementation may include code that provides a hook that enables a developer to hook or add additional code implementing additional functionality to the GUI implementation.

In certain embodiments, downstream model consumers 103 may include one or more code generators 126, 128, and 130 that are configured to take GUI model 124 as input and generate code implementations of the GUI, possibly in different programming languages and/or for different platforms, based on, for example, code generation templates 140 for different programming languages and/or for different platforms. A code generator may take GUI model 124 as input and generate code implementing the GUI in a language specific to that code generator. The implementation may be an executable implementation of the GUI executable by one or more processors. For instance, code generator 126 may take model 124 as input and generate a GUI implementation 110 in a first language for a first platform (e.g., for iOS® platform). Code generator 128 may generate GUI implementation 112 in a second language using GUI model 124 for the first platform. Code generator 130 may generate GUI implementation 114 using GUI model 124 for an Android® platform. A GUI implementation may be compiled (or interpreted, or some other processing performed on it) to generate an executable version of the GUI.

In certain embodiments, GUI implementations 110, 112, and 114 may each correspond to a code generation template that can be used to implement the GUI. A code generation template may include one or more source code files containing high-level code (which may include methods, functions, classes, event handlers, and the like) that can be compiled or interpreted to generate a GUI executable for executing by one or more processors of a computer system. In this manner, a executable implementation of the GUI can be automatically generated based upon GUI model 124, where the executable implementation encapsulates the look and feel of the GUI and the functionalities of the GUI and UI components as described in the GUI design information. For example, code generator 126 may be configured to receive one or more files comprising markup code corresponding to GUI model 124 and output a GUI implementation 110 comprising one or more source code files by translating the markup code (e.g., XML) into (high-level) source code (e.g., Java, C++, or other programming language).

In some implementations, model generation system 102 may provide one or more interfaces that enable a user 106 to interact with model generation system 102, either directly or via a client device 108. These user interfaces may include, for example, various GUIs, command line interfaces (CLIs), and other interfaces. In certain embodiments, model generation system 102 may be part of an integrated development environment (IDE).

Client device 108 may be of different types, including, but not limited to, a personal computer, a desktop computer, a mobile or handheld device (e.g., a laptop, smart phone, tablet, and the like), or other types of devices. In certain embodiments, client device 108 may be communicatively coupled with model generation system 102 directly or via a communication network. The communication network can be of various types and may include one or more communication networks. Examples of the communication networks may include, without restriction, the Internet, a wide area network (WAN), a local area network (LAN), an Ethernet network, a public or private network, a wired network, a wireless network, and the like, and combinations thereof. Different communication protocols may be used to facilitate the communications between client device 108 and model generation system 102, including both wired and wireless protocols, such as IEEE 802.XX suite of protocols, TCP/IP, IPX, SAN, AppleTalk®, Bluetooth®, and other protocols.

User interactions with model generation system 102 may take various forms. A user may provide GUI screen images 104 to model generation system 102 via these interactions using one or more interfaces provided by model generation system 102. In certain embodiments, outputs (e.g., GUI model 124) of model generation system 102 or information about the status of the processing may be communicated by model generation system 102 to client device 108 and presented to user 106 via client device 108. For example, information related to GUI model 124 may be presented to user 106. User 106 may then review GUI model 124 for accuracy, and if needed, may make changes to GUI model 124. In this manner, user 106 can provide feedback regarding GUI model 124 generated by model generation system 102. Model generation system 102 may then use the feedback to update reference information 121 (e.g., the training samples). The updated reference information 121 may be used for retraining one or more machine learning-based models and/or generating future generations of GUI model 124. For example, if user 106, while reviewing GUI model 124, determines that one of the UI components indicated in the GUI model is incorrectly classified, the user may provide feedback (e.g., the image of the misclassified UI component and the actual class or type of the UI component) to model generation system 102 via client device 108. Model generation system 102 may update GUI model 124 based on the user feedback, such as associating the UI component with proper actions, re-grouping the UI components, or re-generating the layout. In this manner, the feedback loop from the user enables the accuracy of model generation system 102 to be improved over time. The annotated image may then be saved as reference information and may be used as a training sample for retraining some machine learning-based models (e.g., the UI component classifier).

As described above, model generation system 102 is configured to generate GUI model 124 based upon GUI screen images 104 in an automated manner and substantially free from any manual user interventions. Further, the same GUI model 124 may be used for generating GUI implementations for different devices, platforms, and/or languages. In many cases, GUI model 124 may be used by downstream model consumers to generate GUI implementations in an automated manner. For example, a GUI implementation may be generated based upon GUI model 124 without having to manually write code for the implementation by a developer. In this manner, an executable GUI implementation may be automatically generated from GUI screen images 104, and substantially free from any manual user interventions or having to manually write code or logic for the application. This level of automation can substantially speed up the application development cycle and reduce the development costs. In some embodiments, GUI model 124 may also be used to generate tests for automating the testing of GUI implementations.

Figure 2:
FIG. 2 depicts an example of a mockup image of a GUI screen according to certain embodiments.

FIG. 2 depicts an example of a mockup image of a GUI screen 200 according to certain embodiments. The image of GUI screen 200 may be provided by a GUI designer for use by a developer to implement the GUI for an application. GUI screen 200 may include one or more UI components and one or more text content items. The UI components may be located at any location on GUI screen 200. The UI components may include, for example, one or more of buttons, text entry boxes, drop-down lists, drop-down menus, check boxes, icons, tables, photos (of people or objects), line dividers, containers, and the like. For example, as shown in FIG. 2, GUI screen 200 may include buttons 214, text entry boxes 206, radio buttons 210, drop-down lists 212, and drop-down table (e.g., calendar) 208. Some UI components may include an associated text content items. For example, buttons 214 may include a text content item 218, such as "Next," "Cancel," or "OK" on the button. The UI components may have associated attributes, such as sizes, colors, locations, or associated actions or functions.

In some embodiments, the UI components may be arranged on GUI screen 200 according to a layout or a hierarchical structure, such as a table, a list, a tree structure, a flow chart, an organization chart, and the like. For example, in the example shown in FIG. 2, text entry boxes 206 may be aligned vertically and may form a table.

Some UI components may be clickable, selectable, or may other take user input, while some other UI components may be static and may not take any user input. For example, text entry boxes 206 may take user input from a keyboard, radio buttons 210 and drop-down manually may be selectable (e.g., using a mouse), and buttons 214, may be clicked to cause a new GUI screen to be displayed. The UI components of GUI screen 200 may be static components or dynamic components. A static component is one whose displayed value on the GUI screen does not change for different instances. A dynamic component is one whose displayed value on the GUI screen may change for different instances. For example, in FIG. 2, some text entry boxes may be static components. Buttons 214 may be static components if each of them is a different type of UI components. Buttons 214 may also be dynamic components if they are associated with a same type of UI components, and may be generated using the same UI component image by dynamically adding corresponding text, as compared to the case where the text may be a part of the UI component image for each of the button.

As depicted in FIG. 2, GUI screen 200 may include various text information, such as a title 220, entry box description 204, default entry 216, and text information differentiating different UI components of the same type, such as text content items 218 associated with buttons 214. Some text information, such as title 220, may provide a textual description of the application's functionalities. Some text information, such as entry box description 204, may provide a textual description of some UI components. Some text information, such as text content items 218, may each be a part of a UI component, and may describe the functions of the associated UI components, such as buttons 214. Some text information, such as default entry 216, may provide default values for some UI components whose values may be entered, selected, or otherwise changed. The text information may have associated attributes, such as fonts, sizes, colors, locations, and the like. In some embodiments, the text information may include instructions to the users. The text information may be either static or dynamic. Examples of static text in FIG. 2 may include: in the header section: header title "Create Account"; in the body section: attribute titles "First Name," "Last Name," "Email," "User Name," and the like. Examples of dynamic texts in FIG. 2 may include: in the body section: attribute values "English," "Peter," and the like, whose value can change from information for a first person in one instance to information for a second person in another instance.

Various pieces of information may be extracted from the GUI screen image and may be used to identify the UI components and text content items for a screen. Certain attributes of the identified components may be determined, for example, using machine learning-based models. The attributes of the identified components may then be used to generate the GUI model and or the code for implementing the GUI, as described in detail below.

Figure 3:
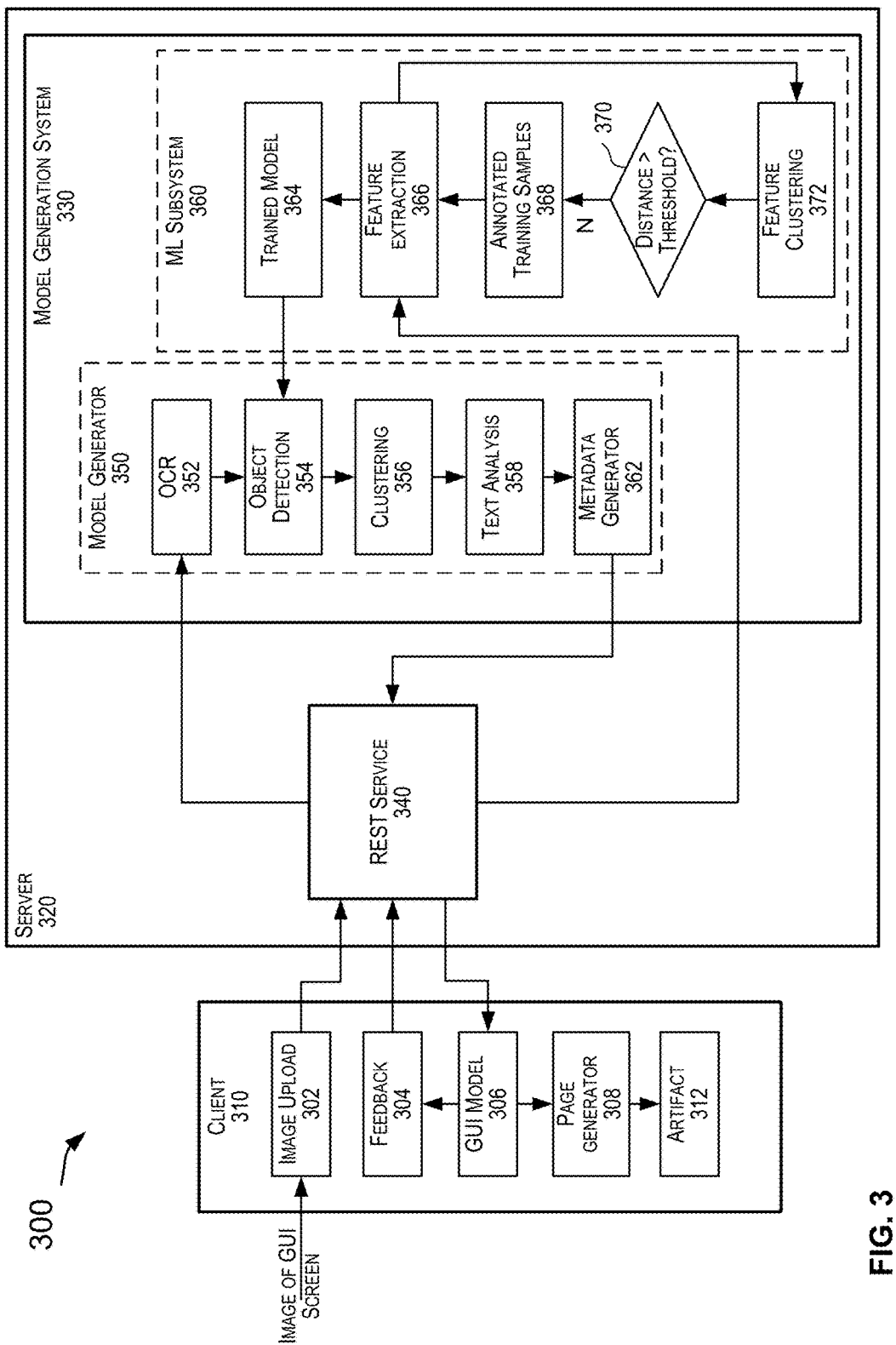
FIG. 3 depicts an example of a system for generating a GUI model for a GUI based upon design information for the GUI according to certain embodiments.

FIG. 3 depicts an example of a system 300 for generating a GUI model for a GUI based upon design information for the GUI according to certain embodiments. In the example, system 300 has a client-server architecture that includes a client subsystem 310 and a server subsystem 320. Client subsystem 310 may include a provision for uploading GUI prototypes in the form of images or sketches and a code generation logic for generating GUI implementations. In some embodiments, the code generation logic may be implemented on server subsystem 320, rather than on client subsystem 310. Server subsystem 320 may include a model generation system 330 and a Representational State Transfer (REST) service 340 that provides interoperability and separation between client subsystem 310 and server subsystem 320. In some embodiments, system 300 may be implemented on a same computing system, such as on a server.

When a GUI design document, such as one or more images (or sketches) for one or more GUI screens, is received, each image of GUI screen may be uploaded by an image uploader 302 on client subsystem 310 to server subsystem 320. The image of the GUI screen may be sent to server subsystem 320 through REST service 340, which may pass the image of the GUI screen to model generation system 330 to start the model generation process on server subsystem 320. Model generation system 330 may include a model generator 350 that is configured to generate a GUI model based upon the image of the GUI screen and machine learning-based model(s) generated by a machine learning subsystem 360.

Machine learning subsystem 360 may generate machine learning-based model(s) used for generating GUI models based on GUI design documents, such as images of GUI screens. The machine learning-based models may include, for example, a UI component detector and/or classifier and a text detector and/or a character classifier. In some embodiments, the machine learning-based model may include a neural network-based classifier, such as a convolutional neural network (CNN), that can identify and classify objects in an image file.

A machine learning-based model may be trained using supervised learning techniques and annotated training samples 368. Annotated training samples 368 may include images that include various UI components, such as buttons, text fields, text entry boxes, drop-down lists, drop-down menus, icons, tables, pie-charts, bar charts, etc. The annotations may include a label or tag that uniquely identifies each UI component, such as the location of each UI component within an image, the type or class of the UI component or actions associated with the UI component). In some embodiments, the annotations may be stored in the image file as metadata. In some embodiments, the annotations may be stored separately from the image file. In some embodiments, the images in the training samples may not include any text content. For example, the text content items in the images used to generate the training samples may be identified and replaced with pre-defined patterns, such as black boxes or white boxes.

Annotated training samples 368 may be passed to a feature extraction engine 366. Feature extraction engine 366 may implement, for example, a deep CNN to derive features at different levels from the images of various components. In contrast, conventional computer vision-based techniques may involve laborious task of feature engineering, where features that are distinct for a particular UI components may be identified manually and sent to a classifier, such as a support vector machine (SVM) or a shallow neural network.

Feature extraction engine 366 may perform operations, such as convolution, non-linearity (or activation) function (e.g., ReLU), and/or pooling (or sub-sampling), on input images at different layers of the deep CNN. The convolution operations in a CNN may be used to extract features from an input image (e.g., a training image or a GUI screen image). In the convolution, a matrix (referred to as a filter, a kernel, or a feature detector) may slide over the input image (or processed pixel array or feature map) at a certain step (referred to as the stride). For every position (or step), element wise multiplications between the filter matrix and the overlapped matrix in the input image may be calculated and summed to get a final value which represents a single element of an output matrix, which may be referred to as the convolved feature or feature map.

An additional non-linear operation using an activation function (e.g., rectified linear unit (ReLU)) may be used after every convolution operation. The purpose of ReLU is to introduce non-linearity in the CNN. Other non-linear functions, such as the tan h or sigmoid function, can also be used, but ReLU has been found to perform better in most situations.

Spatial pooling (also called subsampling or down-sampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling because the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, and the like.

To extract features from an input image (e.g., a training image or a GUI screen image), a convolution layer may first be used to convolute the input image with one or more filters to generate one or more feature maps for an input image, such as detecting edges or gradients in an image. The activation function may introduce non-linearity into the feature maps. Optionally, the pooling layer may downsample the feature maps to reduce the dimensions of the feature maps. The convolution, non-linearity (or activation) function, and optional pooling or sub-sampling operations may be performed again on the feature maps generated by previous layers to extract feature maps at a different level, where the feature maps from the previous layers may be used as the input for the convolution. In this way, feature maps at multiple levels may be extracted and used to detect and classify UI components in the GUI screen images or training images.

A machine learning-based model can then be trained using the extracted features and the annotations in the annotated training samples. In some embodiments, an object detection technique, such as the SSD technique (see, e.g., Liu et al., "SSD: Single Shot MultiBox Detector," arXiv: 1512.02325v5, Dec. 29, 2016) or YOLO technique (see, e.g., Redmon et al., "YOLO9000: Better, Faster, Stronger," arXiv:1612.08242v1, Dec. 25, 2016) may be used to localize objects at various different locations of a training image using the extracted features. For example, a classification layer (such as a fully connected layer) in a deep CNN may use the extracted features to detect and classify UI components present in the training image. The classification results may be compared with the annotations associated with the training sample. If the classification results do not match the annotations, feedback may be provided to the classification layer and/or the feature extraction layers (e.g., the convolution layers) to adjust the parameters of the deep CNN using, for example, the back propagation technique. The above-described training process may be repeated for each training sample. Because the deep CNN can learn a set of features that can be used to differentiate various types of UI components by itself based on the annotated training samples, the laborious task of feature extraction can be avoided. After the training process, a trained model 364 may be generated, which may be able to accurately detect and classify UI components present in the training samples. More detailed processing for generating the machine learning-based models is described below with respect to, for example, FIG. 5.

Model generator 350 may include an optical character recognition (OCR) module 352. OCR module 352 may detect and recognize text content in the image of the GUI screen and/or separate the text content from the GUI screen image. In some embodiments, OCR module 352 may use machine learning-based classifier to detect and recognize text content. The output of OCR module 352 may include text content items and their locations, and an image without text content. As described in detail below, in the output image from OCR module 352, the regions where text content items are present in the GUI screen image may include some pre-defined patterns, such as black boxes. The output of OCR module 352 may be passed on to an object detection module 354. More detailed operations of OCR module 352 are described below with respect to, for example, FIG. 7.

Object detection module 354 may detect and classify UI components in the output image from OCR module 352 using machine learning-based model(s) generated by machine learning subsystem 360. For example, the machine learning-based models may include a UI component detector and/or classifier. In some embodiments, the machine learning-based model may include a neural network-based classifier, such as a convolutional neural network, that can identify and classify objects in an image. Object detection module 354 may use the machine learning-based model to identify UI components in the GUI screen image, and classify each UI component to determine the type of the UI component and the associated actions or functions. The output of object detection module 354 may include the text content items (and their location information), and information regarding the identified UI components in the GUI screen image, such as the locations, types (or classes), associated actions or functions.

In some embodiments, the output of object detection module 354 may be sent to a clustering module 356. Clustering module 356 may group the detected UI components and text content items based upon, for example, location information of the UI components and/or the text content items, the types of the UI components, etc. For example, the grouping may be based on distance and/or similarity between the components. In some embodiments, clustering module 356 may perform the grouping using a set of rules. For example, a text content item may be grouped with a text input UI component but not with a button. As another example, a button and a date picker component (e.g., a calendar) may not be grouped together and may be considered as individual elements in the layout. In some embodiments, the set of rules used for the grouping may be stored in a data structure (e.g., a table or a list) in a persistent memory device, such as being stored as a part of reference information 121 in memory 122.

Clustering module 356 may perform the grouping recursively in a bottom up manner. For example, individual components (e.g., UI components and/or text content items) may be grouped into subgroups, the subgroups may then be grouped into higher level subgroups, and so on, until a single group would cover all the components in the image. Based on the grouping at different levels, clustering module 356 may determine a hierarchy of the components in the GUI screen image and an optimum layout for the GUI screen using the location information. The output of clustering module 356 may include a cluster map or a layout of the GUI screen.

In some embodiments, the text content items, UI components, information (e.g., locations, types, etc.) associated with the text content items and UI components, and the cluster map (or layout) may be passed to text analysis module 358. Text analysis module 358 may analyze the text content items to identify clickable text content items in the GUI screen image. A clickable text content item may indicate some actions or functions and may usually include at least one verb (e.g., cancel, save, clear, etc.), and may not be associated with any UI component. For example, a text content item with the text "Cancel" separate from other text content items may be meant to be a clickable text. In some embodiments, a dictionary of such clickable words may be maintained and used for the text analysis.

In some embodiments, the output of OCR module 352 may include individual words along with their location information. After the grouping by clustering module 356, an individual word may become part of a line or a paragraph or may be an independent item on a GUI screen image. Clustering module 356 may group the individual words if they are part of a line or a paragraph. A clickable text content item may be identified from words that are independent items or are in a line with up to a certain number of words, but not from words that are part of a paragraph. In some embodiments, the type of the text content items that are identified as clickable may be changed from text" to "clickable text".

After the text analysis to identify and change the type associated with clickable text content items, the cluster map may be updated and fed to a metadata generator 362. Metadata generator 362 may generate a GUI model for the GUI that may include one or more GUI screens. The GUI model may be an optimum representation of the GUI screen images that are submitted to server subsystem 320. In some embodiments, metadata generator 362 may generate the GUI model in a data-interchange format that is language independent, such as JavaScript Object Notation (JSON) format. The GUI model (e.g., described in JSON metadata) may then be sent to client subsystem 310 through REST service 340 as the response to the request from client subsystem 310.

After receiving a GUI model 306, client subsystem 310 may sent the GUI model (e.g., in JSON metadata) to a page generator 308. Page generator 308 may include a code generator (e.g., code generator 126, 128, or 130) as described above with respect to FIG. 1. Page generator 308 may take GUI model 306 as input and generate code implementing the GUI in a target language for a target platform, such as a mobile device that is operated using iOS® or Android® or a system with a wide-screen that is operated using iOS®, Windows®, or Linux. For example, the code may be generated for Angular JS or Bootstrap. The GUI implementation may be an executable implementation of the GUI executable by one or more processors. In some embodiments, a GUI implementation may be compiled (or interpreted, or some other processing performed on it) to generate an executable version of the GUI. Page artifact 312 generated for the GUI may then be made available to end-users.

In some cases, model generation system 330 may not accurately detect or classify the UI components in the GUI screen image. A feedback process may be used to provide feedback to model generation system 330 to correct the generated GUI model. For example, a developer may review GUI model 306 and identify undetected or misclassified UI components, and provide the image of the identified undetected or misclassified UI components and the correct labels to model generation system 330 through an optional feedback module 304. For example, if there is a UI component that has been misclassified or undetected by model generation system 330 (more specifically, object detection module 354), the image of the misclassified or undetected UI component or the GUI screen image that includes the misclassified or undetected UI component may be provided to model generation system 330 through REST service 340, along with the correct label for the misclassified or undetected UI component. The feedback information may be used by feature extraction engine 366 to extract features (e.g., feature maps or feature vectors) from the image of the misclassified or undetected UI component or the GUI screen image as described above. In some embodiments, the features extracted from the user feedback may be sent to a feature clustering module 372.

Feature clustering module 372 may map features of each of the UI components in the training samples to a data point in a feature space that may be a multi-dimensional space. A set of clusters may be formed in the feature space, where each cluster may correspond to a type of UI components. The inter-cluster variance (or distance) may be significant such that the UI components can be properly classified using these features. The features extracted from the feedback image of the misclassified or undetected UI component may also be mapped to a data point in the feature space. Distances between the data point representing the features extracted from the image of the misclassified or undetected UI component and the cluster center of the set of clusters may be calculated to determine the similarity or dissimilarity between the misclassified or undetected UI component and the UI components already included in the training samples. If one of the distances is below a threshold value, the image of the misclassified or undetected UI component may be added to the training samples and the retraining of the machine learning-based model may be triggered. In some embodiments, the threshold value may be determined based on experimental results.

The threshold value may help to ensure a certain level of security for annotated training samples 368. For example, in some cases, a developer may accidently label a "Pie Chart" as a "Bar Chart." If the distances are not calculated to filter the annotated sample provided by a developer in the feedback as described above, the machine learning-based model may be retrained with the mislabeled sample, which may make the retrained model worse than the previous model or may cause the training process to fail to converge. Thus, feature clustering module 372 and a distance comparison block 370 may help to ensure that the model is only retrained using a user provided sample when the UI component in the user provided sample is similar to some UI components already in the training samples. In some embodiments, if the computed distances exceed the threshold value, the user provided sample may be ignored. In some embodiments, human intervention may be requested if the computed distances exceed the threshold value.

The model retrained using the user provided sample may then be used to detect and classify UI components in the current GUI screen image and subsequently received GUI screen images. The GUI model may be updated based on the detection and classification results using the retrained model, and sent back to client subsystem 310 for generating the GUI implementations.

The system described in FIG. 1 or FIG. 3 may be used to train machine learning-based models and use the models to automatically generate GUI model and/or GUI implementations.

Figure 4:
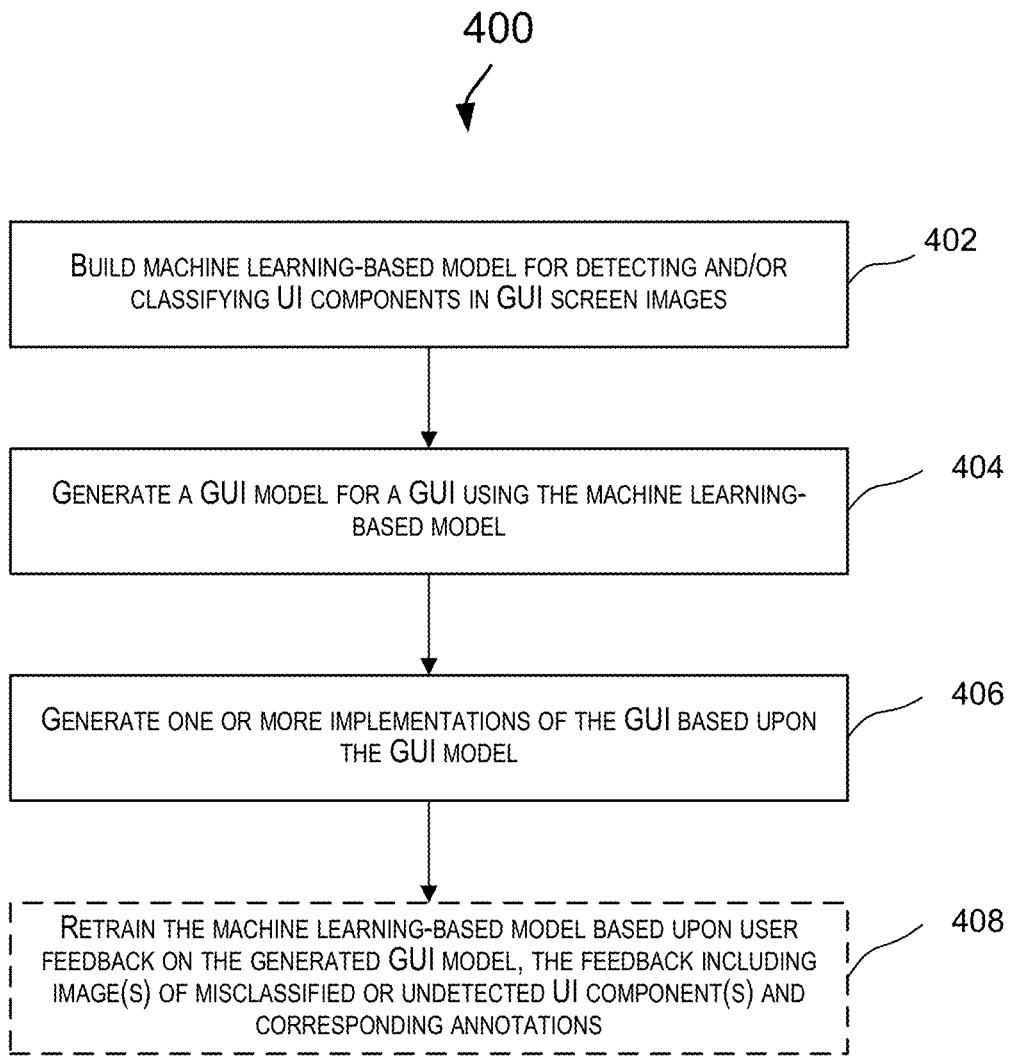
FIG. 4 is a simplified flowchart depicting high-level processing performed for generating a GUI model and/or one or more implementations of a GUI using a machine learning-based classifier according to certain embodiments.

FIG. 4 is a simplified flowchart 400 depicting high-level processing performed for generating a GUI model and/or one or more implementations of a GUI using a machine learning-based classifier according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by a server including model generation system 102 or 300 as described above, a client computer system, a processor (e.g., a graphic processing unit (GPU) or a tensor processing unit (TPU)), an ASIC, or an FPGA.

As illustrated in FIG. 4, the processing may start at 402 where a model generation system, more specifically, a machine learning subsystem (e.g., machine learning subsystem 360 in model generation system 330), may build a machine learning-based model, such as a classifier for detecting and classifying UI components in GUI screen images. To build the machine learning-based classifier, the type of the classifier, such as a support vector machine (SVM) classifier or a convolutional neural network (CNN) classifier, may be selected first. Some parameters of the classifier, such as the type of kernel for the SVM or the number of layers and the number and sizes of the filters for the CNN classifier may be determined. Training samples (such as training images of known types of UI components or training images of GUI screens with known types of UI components) may then be processed based upon the selected type of classifier and/or the parameters of the classifier. In some implementations, to improve the accuracy and speed of the training and inference process, text information may be extracted and removed from the training images before the training and/or the inference process starts. The processed training images with known types of UI components (indicated by annotations) may then be used to train the classifier.

For example, the parameters of the classifier (e.g., various weights or filters for convolution layers in the classifier) may be initialized (e.g., to some random or default values), and, for each training image, the classifier may extract features from the training image, and classify the training image based on the extracted features. A loss function value (e.g., an error) may be determined based on the known type(s) of UI component(s) in the training image and the classification result(s). The parameters of the classifier may be adjusted to reduce the loss function value. In some implementations, classifying a training image using the classifier may include extracting features from the training image, such as generating feature maps by convoluting the training image with filters or extracting features from certain histogram of the image (e.g., a color histogram or a histogram of gradient), and determining the type(s) of the UI component(s) in the training image based upon the extracted features of the training image. More detail of building the machine learning-based model is described below with respect to FIG. 5.

At 404, a model generation system may generate a GUI model for a GUI using the machine learning-based model. For example, in some implementations, each of the input GUI screen images may be processed to identify and extract GUI components including text content items and individual UI components, determine parameters of the text content items and the UI components (e.g., sizes, locations, colors, and the like), and classify the UI components to determine the types of the UI components, using the machine learning-based model(s). The classified UI components and the text content items may then be grouped to form a hierarchy of GUI components. A layout (or cluster map) of a GUI screen may be determined based on the hierarchy. In some embodiments, clickable text content items may be identified. The GUI model may then be generated to describe the layouts of the GUI screens, the UI components in the GUI screens, the text content items in the GUI screens, and the like. In some implementations, the GUI model may be described in a data-interchange format that is language independent, such as JavaScript Object Notation (JSON) format. The GUI model generated in 404 can then be used for various downstream purposes.

For example, at 406, one or more implementations of the one or more GUI screens of the GUI may be automatically generated based upon the GUI model. In some embodiments, based upon the platform that the GUI may be used on and the target language for the implementation, a code generation template may be selected from available code generation templates (e.g., code generation templates 140 described with respect to FIG. 1). A code generator (e.g., code generator 126, 128, or 130) may generate the code for implementing the GUI based upon the selected code generation template and the GUI model as described above with respect to FIG. 1. In certain embodiments, the implementation may be an executable implementation of the GUI executable by one or more processors. In other embodiments, the implementation may include code and logic for implementing the GUI. The implementation may then be compiled or interpreted to generate an executable GUI.

In some embodiments, at 408, the model generation system may receive user feedback regarding the GUI model generated at 404. For example, if there is a UI component that has been misclassified or undetected in the GUI model, the image of the misclassified or undetected UI component or the GUI screen image that includes the misclassified or undetected UI component (and the location of the misclassified or undetected UI component in the image) may be provided to the model generation system, together with the annotation for the misclassified or undetected UI component provided by the user. The image of the misclassified or undetected UI component and the annotation may be used to retrain the machine learning-based model and/or regenerate the GUI model. In some embodiment, the image of the misclassified or undetected UI component and the annotation may be filtered as described above, before being used for retraining the machine learning-based model.

Figure 5:
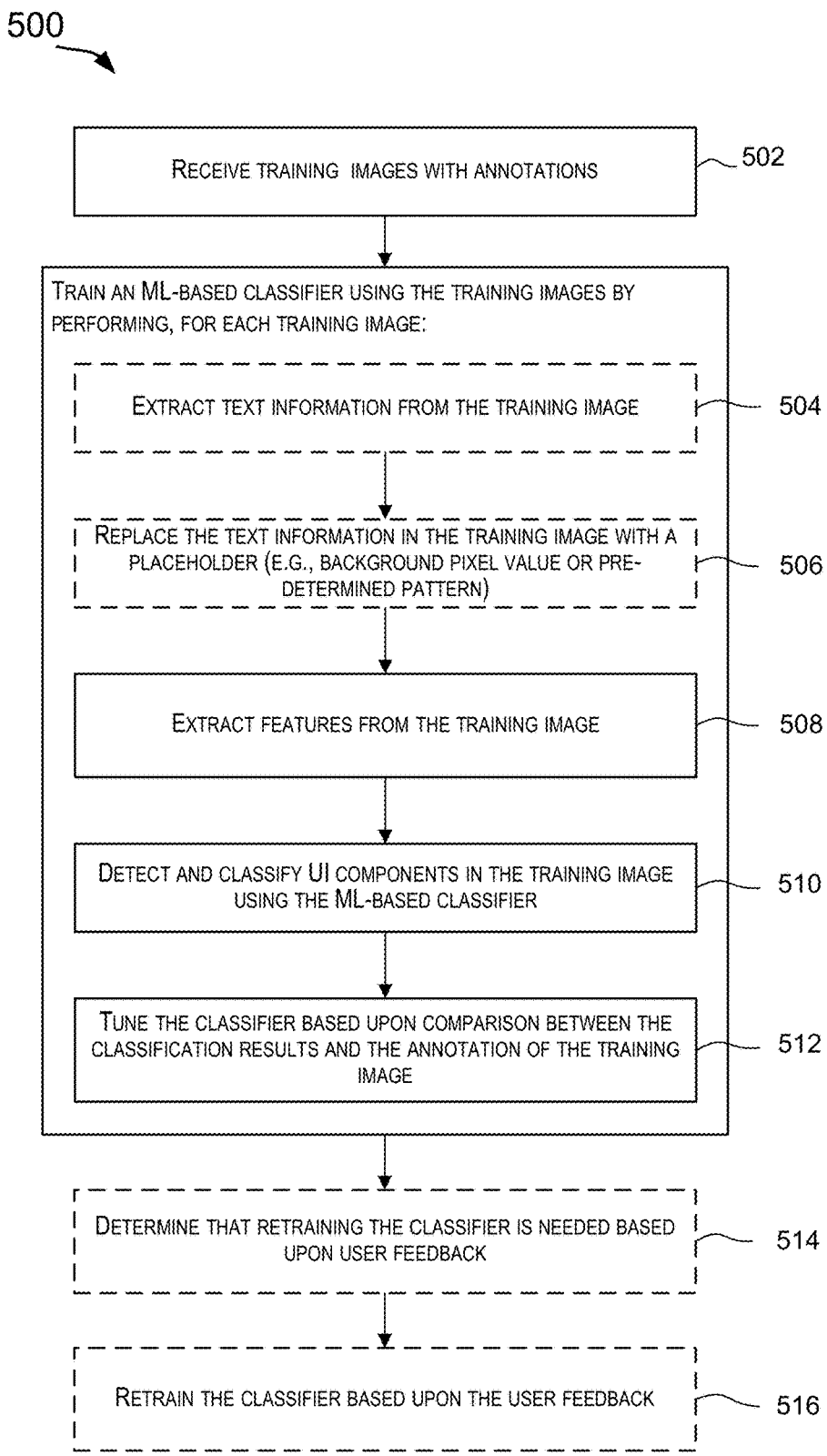
FIG. 5 is a simplified flowchart depicting high-level processing performed to train a machine learning-based classifier for detecting and classifying user interface components according to certain embodiments.

FIG. 5 is a simplified flowchart 500 depicting high-level processing performed to train a machine learning-based classifier for detecting and classifying user interface components according to certain embodiments. In certain embodiments, the processing depicted in FIG. 5 may be performed as part of the processing performed in 402 in FIG. 4. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5 may be performed by model generation system 102, machine learning subsystem 360, a processor (e.g., a GPU or a TPU), an ASIC, or an FPGA.

At 502, one or more annotated training images may be received and stored, for example, in memory 122. The training images may include various UI components with known types, such as buttons, text entry boxes, drop-down lists, drop-down menus, check boxes, radio buttons, switch buttons, icons, tables, photos (of people or objects), line dividers, containers, and the like. The training images may be annotated with the types of the UI components and other information associated with the UI components, such as the locations of the UI components in the training images. In some embodiments, each training image may only include an image of one UI component. In some embodiments, each training image may include multiple UI components. In some embodiments, each training image may correspond to an image of a GUI screen that may or may not include text content. In some embodiments, the training GUI screen images may be from various sources across various front-end technologies that may be used to design a GUI.

Each training image may be processed to extract and classify the one or more UI components in the training image. In some embodiments where the training images including features other than he UI components, to improve the accuracy and speed of the training process, visual features that are likely to interfere with UI component detection and classification for the training, such as the text content, may be temporarily erased. For example, for each training image corresponding to a GUI screen, text information may be extracted and removed from the training image before the one or more UI components are detected and classified, as described in the following operations at 504 and 506. For each training image, features in the image may be extracted, UI components in the training images may be detected and classified using a machine learning-based classifier being trained based upon the extracted features. The classifier may be tuned based upon the comparison between the classification results and the annotation for the training image.

Optionally, at 504, text information (if present) may be extracted from the training image. The text information extraction may include detecting text content items in the training image and recognizing the detected text content items. For example, in some embodiments, a fully convolutional network (FCN) model (see, e.g., Zhou, et al., "EAST: An Efficient and Accurate Scene Text Detector," arXiv:1704.03155v2, Jul. 10, 2017) may be used to detect text content items in the training image and determine the locations (e.g., the coordinates of the bounding boxes) and/or the dimensions of the text content items. In some embodiments, an extension of a design tool (e.g., GIMP or Photoshop) may be used to extract text regions from layers of the training image. The sub-images at the determined locations may then be extracted, and an optical character recognition (OCR) process may be performed on each of the extracted sub-images to extract the text information associated with each text content item. In some embodiments, the OCR process may also use a machine learning-based model to recognize characters in the text content items. For example, in some cases, the text content items may include hand-written characters that may not be correctly recognized using conventional OCR techniques. A machine learning-based classifier may be used to classify each character into one of a set of known characters.

At 506, the text information (if present) in the training image may be replaced with placeholders, such as a predefined pattern. For example, the pixel values in the sub-images may be replaced with background pixel values or pre-determined pixel values, such that no text content items may interfere with the subsequent UI component detection and classification. In some implementations, the placeholders may also serve as features for training purposes. For example, a placeholder may indicate that the original UI component may include certain text information and thus is likely to be one of certain types of UI components, such as a clickable button or a text entry box. In addition, the alignment of the text content item within the UI component can be reserved by the placeholder.

At 508, certain features may be extracted from the training image. For example, as described above with respect to feature extraction engine 366, a deep CNN may be used to extract various features (e.g., feature vectors or feature maps) at different levels from the training image. Different features may be extracted using different filters. For example, a filter may be used to convolute with the training image to a feature map that includes the edges or contours of objects in the training image. The types of features to be extracted may be automatically determined during the training process such that different types of UI components can be accurately detected and classified based on the extracted features.

At 510, a machine learning-based classifier, such as an SVM classifier or a CNN classifier, may detect and classify UI components in the training image based upon the features extracted at 508. In various embodiments, the UI component detection and UI component classification may be performed separately using different machine learning-based models or may be performed jointly by a same classifier. In some embodiments, UI components in the training image may first be identified and extracted from the training image using various contour detection techniques that can detect the boundaries of each of the UI components, and the extracted UI components in sub-images may then be classified. For example, a neural network may implement an object detection technique (e.g., SSD or YOLO technique described above) to localize one or more UI components at one or more different locations of the training image using the extracted features. Based on the location or the boundaries of each UI component, a sub-image within the boundaries for each UI component may be extracted. The sub-image extracted from the determined location of the training image that include the UI component may then be used for the UI component classification by a classifier. In some embodiment, a same deep neural network may perform joint UI component detection and classification, where the extracted features may be used to both localize one or more UI components at one or more different locations of the training image and classify the one or more UI components in a pipeline or in parallel. In some embodiments, in order to train the machine learning-based model (e.g., neural network) to detect multiple UI components in a GUI screen image, at least some training images may also include multiple UI components at different locations.

During the UI component classification, certain features extracted from the training image may be used in combination to distinguish UI components of one type from UI components of other types. As described above, because interference features, such as the text information, may be replaced with some potentially distinguishing features (e.g., a pre-defined pattern), the training process may be faster and may yield a more accurate classifier. There may be several different machine learning-based classifiers that can be used to classify the UI components. Some examples of classifiers that may be used to classify the UI components are described below.

In some implementations, a support vector machine (SVM) classifier may be used to classify the UI components. SVM classifiers are based on decision planes that define decision boundaries. An SVM classifier may be a linear classifier (i.e., a classifier that separates a set of objects into their respective classes or groups with a line), or a non-linear classifier where more complex structures (hyperplanes) based on nonlinear kernel function may be used to separate objects of different classes. In some embodiments, histogram features of the image (e.g., color histogram, histogram of gradient), rather than the pixels of the image, may be used for the classification using the SVM classifier.

As described above, various neural network based classifiers may also be used to classify the UI components. For example, a neural network based classifier may include some layers for feature extraction and some layers (e.g., fully-connected layers) for classification. The layers for feature extraction may be similar to the feature extraction layers described above with respect to feature extraction engine 366. In the fully connected layers, every node in a layer is connected to every node on the adjacent layer(s). The fully-connected layers may use the extracted features of the input image as input to classify the input image into various classes at the output layer, where each node on the output layer may correspond to a possible class (or type) of UI components. For example, the fully-connected layer may use a Softmax activation function on the output layer. The Softmax function may take a vector of arbitrary real-valued scores and transform it to a vector with values (probabilities) between zero and one that sum to one. The input image may then be classified based on the probability value associated with each possible class at the output layer.

At 512, the classifier (e.g., a CNN based classifier) may be tuned based upon the comparison between the classification results and the annotation of the training image. In general, parameters (e.g., the weights in the filters and weights for the fully-connected layer) of the classifier may first be initialized with some random values, default values, or values used in similar classifier. Since the parameters of the classifier, such as the weights, may have random values and are not optimized for the training example, the output probabilities may be random. In some embodiments, the classification error for each possible class may be determined based on the classification results and the annotation of the training image, the total error at the output layer may be calculated by summing the probability errors for all possible classes. Techniques such as the backpropagation techniques may then be used to calculate the gradients of the error with respect to all parameters and weights to be trained in the network, and to use the gradient descent to update all parameters and weights to be trained in the network in order to minimize the output error. The weights may be adjusted according to their contribution to the total error. When the same training image is at the input again, the output probabilities might be closer to the target probabilities, which indicates that the network has learnt to classify this particular image. The above-described training process may be repeated with all training images in the training samples. As described above, some parameters of the convolutional neural network, such as the number of filters, filter sizes, architecture of the neural network, and the like, may have been pre-selected and remain unchanged during the training process.

At the end of the training process, all parameters of the classifier may have been optimized to correctly classify the training images from the training samples. When an unseen image (e.g., a test image or a new image) is input into the classifier, the classifier may go through the forward propagation step and output a probability for each class using the trained weights and parameters, which may be referred to as an inference process as compared to the training process. If the training samples are sufficient, the trained classifier may classify the unseen sample into a correct class.

As described above, in some embodiments, the classifier may be retrained based on user feedback. For example, a user may review a GUI model generated by a model generation system using the machine learning-based classifier. If there is a UI component that has been misclassified or undetected by the classifier, the image of the misclassified or undetected UI component or the GUI screen image that includes the misclassified or undetected UI component may be fed back to the model generation system, along with the correct annotation for the misclassified or undetected UI component provided by the user.

At 514, a machine learning subsystem, such as machine learning subsystem 360, may determine whether retraining the classifier is needed based upon the user feedback. For example, features of the image in the feedback may be extracted as described above at 508, and mapped to data points in a multi-dimensional feature space. The feature space may include a set of clusters corresponding to different types of UI components already in the training samples. Distances between the data point representing the features extracted from the image of the misclassified or undetected UI component and the cluster center of the set of clusters may be calculated to determine the similarity or dissimilarity between the misclassified or undetected UI component and the UI components included in the training samples. If one of the distances is below a threshold value, the image of the misclassified or undetected UI component and the annotation provided by the user may be considered reliable, and may be added to the training samples and trigger the retraining of the machine learning-based model. If the computed distances exceed the threshold value, the user provided image and annotation may be ignored or human intervention may be requested.

At 514, the classifier may be retrained based upon the user feedback if it is determined that the image and annotation provided in the user feedback is reliable. The operations for retraining the classifier based on the user feedback may be similar to the operations described above with respect to 508, 510, and 512.

After the machine learning-based model is trained, the model generation system may use the machine learning-based model to generate GUI models based on GUI screen images provided by users. Source code for implementing the GUI may also be automatically generated with minimum human intervention.

Figure 6:
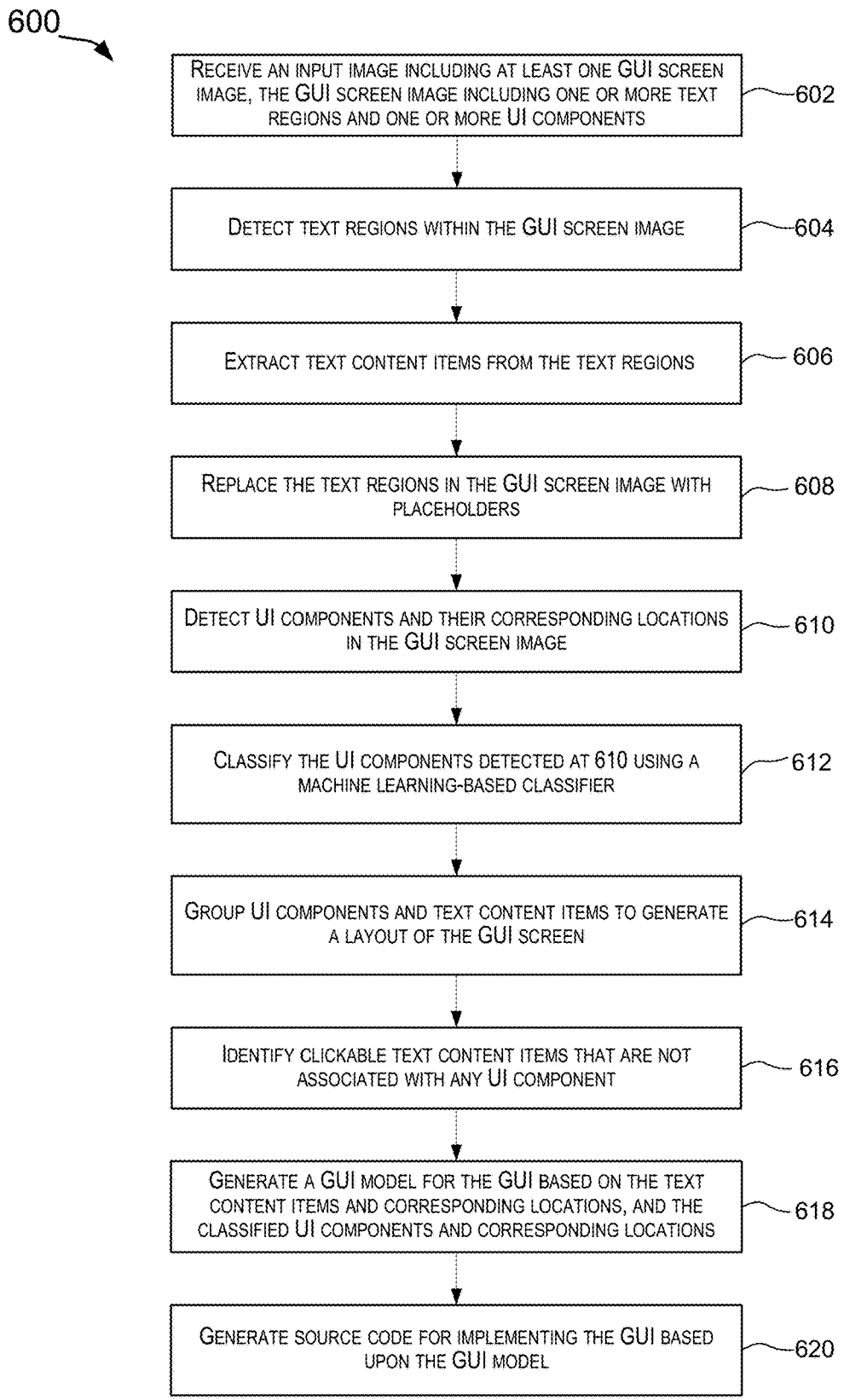
FIG. 6 is a simplified flowchart depicting high-level processing performed for generating a GUI model and/or source code for a graphic user interface based upon design information of the GUI according to certain embodiments.

FIG. 6 is a simplified flowchart 600 depicting high-level processing performed for generating a GUI model and/or source code for a graphic user interface based upon design information of the GUI according to certain embodiments. The processing depicted in FIG. 6 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 6 are not intended to be limiting. It is appreciated that the processing steps may be performed in an order different from that depicted in FIG. 6, and that not all steps depicted in FIG. 6 need to be performed. In some embodiments, at least some of the processing depicted in FIG. 6 may be performed by model generation system 102 depicted in FIG. 1 or model generation system 330 of FIG. 3.

For the sake of simplicity, flowchart 600 depicted in FIG. 6 and the associated description provided below describes processing for a single GUI screen image for the GUI. This however is not intended to be limiting. In alternative embodiments, multiple GUI screen images may be used to describe multiple GUI screens for an GUI. In some such scenarios, the processing depicted in FIG. 6 (or some of the processing) may be repeated for each GUI screen for the GUI.

At 602, an input image including one or more GUI screen images may be received. Each GUI screen image may include one or more UI components and one or more text regions that include text information. Each GUI screen image may first be detected and extracted from the input image. As described above, the GUI screen image may be generated by a user interface designer based upon customer or client surveys, marketing surveys, and other sources of information that drive the look and feel of the GUI and the functionalities to be included in the GUI to be developed. The GUI screen image may be generated using a computer aided design tool and saved in a digital format, or may be generated manually as sketches on paper and then be scanned into digital images. In some embodiments, the GUI screen image may be a snapshot of a previous version of the GUI with some modifications. In certain embodiments, a program executed by client device 108 (or client subsystem 310) may enable the user to interface and interact with model generation system 102 (or model generation system 330). For example, the program may be part of an integrated development environment (IDE) that provides facilities and tools for users (e.g., programmers) to build software applications. In such an environment, an IDE may provide a tool that enables a user to import (e.g., drag and place) a GUI screen image designed by a UI developer.

As described above, the GUI screen image for a GUI may be subjected to various analyses in order for the model generation system to determine the functionality and layout for a GUI screen, the components of the GUI screen, the types and functions of the UI components, the mapping between the UI components, and the like.

At 604, text regions that include text content may be detected and extracted from the GUI screen image. The text content in each text region may include one or more text content items. In some embodiments, a fully convolutional network model may be used to detect text regions in the GUI screen image and determine the locations (e.g., the coordinates of the bounding boxes) and/or the dimensions of the text regions. In some embodiments, an extension of a design tool (e.g., GIMP or Photoshop) may be used to extract text regions from layers of the training image. The sub-images at the determined locations may then be extracted and used for text content item extraction.

At 606, text content items and corresponding locations in the text regions may be extracted from the sub-images. For example, in some embodiments, an optical character recognition (OCR) process may be performed on each of the extracted sub-images to extract the text information associated with each text content item. In some embodiments, the OCR process may also use a machine learning-based model to recognize characters in the text content items. For example, in some cases, the text content items may include hand-written characters that may not be correctly recognized using conventional OCR techniques. A machine learning-based classifier may be used to classify each character into one of a set of known characters. More details of text content item detection and recognition are described below with respect to FIG. 7.

At 608, the text regions in the GUI screen image may be replaced with placeholders. For example, the pixel values in the sub-images may be replaced with background pixel values or pre-determined pixel values, such that no text regions may interfere with the subsequent UI component extraction and classification. As described above, in some implementations, the placeholders may also serve as features for classification purposes. For example, a placeholder may indicate that the original UI component may include certain text information and thus is likely to be one of certain types of UI components, such as a clickable button or a text entry box. Thus, the placeholders can help to increase the accuracy of the classifier in detecting UI components and determining the types of the UI components. In addition, the alignment of the text content item within the UI component can be reserved by the placeholder. In some implementations, only texts that may overlap with UI components or adjacent to UI components may be replaced with placeholders.

At 610, UI components may be detected and the corresponding locations in the GUI screen image may be determined in a manner similar to the processing described above with respect to 510. The UI components may include, for example, buttons, check boxes, lists, text entry boxes, icons, containers, radio buttons, switch buttons, and the like. Various contour detection techniques may be used to detect the boundaries of each of the UI components. For example, a neural network may extract features from the GUI screen images as described above, and may implement an object detection technique (e.g., SSD or YOLO technique described above) to localize one or more UI components at one or more different locations of the GUI screen image uses the extracted features. Based on the location or the boundaries of each UI component, a sub-image within the boundaries for each UI component may be extracted from the GUI screen image.

At 612, the UI components detected in 610 may be classified using a machine learning-based classifier and the sub-images. As described above, the machine learning-based classifier may include, for example, an SVM or a CNN classifier that may be trained using training images including known types of UI components. The classifier may determine the type of UI component that an UI component may belong to. In some embodiments, each type of UI component may be associated with a data model that may describe, for example, the image or the source of the image, the function, the corresponding action, corresponding code, link to other application or GUI screen, and the like, for the type of UI component. As described above, in some embodiments, the operations at 610 and 612 may be performed by a same deep CNN-based classifier.

At 614, the UI components detected at 610 and classified at 612 and the text content items detected at 604 and extracted at 606 may be grouped to generate a layout of the GUI screen. As described above, a clustering module (e.g., clustering module 356) may perform the grouping recursively in a bottom up manner based upon certain pre-defined rules. Attributes of the text content items and the UI components, such as the locations, sizes, types, functions, and the like, may be used for the grouping. For example, individual components (e.g., UI components and/or text content items) may be grouped into subgroups (e.g., representing a table, a list, an organization chart, a paragraph, and the like), the subgroups may then be grouped into higher level subgroups, and so on, until a single group would cover all the components in the image. For example, the text content items extracted at 606 may include individual words along with their location information. The clustering module may group the individual words if they are a part of a line or a paragraph. Based on the grouping at different levels, the clustering module may determine a hierarchy of the components in the image and an optimum layout for the GUI screen using the hierarchy and location information.

At 616, clickable text content items that are not associated with any UI component may be identified. A clickable text content item may indicate some actions or functions and may usually contain at least one verb (e.g., cancel, save, clear, etc.), but may not be associated with any UI component. For example, a text content item with the text "Cancel" separate from other text content items may be meant to be a clickable text and an action may be taken if the text content item is clicked on. Thus, the GUI model may need to describe the text content item as clickable and may provide the link or code associated with the clickable text content item. In some embodiments, a clickable text content item may be identified from words that are independent items or are in a line with up to a certain number of words, but not from words that are part of a paragraph. In some embodiments, the type of such clickable text content items may be changed from "text" to "clickable text".

At 618, a GUI model may be generated for the GUI based upon the text content items and corresponding locations, the classified UI components and corresponding locations, and the layout for the GUI screen. In certain embodiments, the GUI model may store information related to the processing performed at 604, 606, 610, 612, 614, and 616. For example, the GUI model may store indicative of: the text content items in the GUI screen determined in 604 and 606, the locations of the UI components determined in 610, the types of the UI components (and the data model associated with the UI components) as determined in 612, the layout for the GUI screen determined in 614, and the like. The information stored in the GUI model can be used by a downstream consumer to generate an implementation of the GUI. In some implementations, the GUI model may be generated as metadata for a GUI. In some implementations, the GUI model may be described in a data-interchange format that is language independent, such as JavaScript Object Notation (JSON) format.

At 620, source code for implementing the GUI may be automatically generated based upon the GUI model. In some embodiments, the source code for implementing the GUI may be generated based on certain code generation templates. For example, various code generator applications (e.g., code generators 126, 128, and 130) may take the GUI model as input and generate code for implementing the GUI, possibly in different programming languages and/or for different platforms, based on, for example, code generation templates 140 for different programming languages and/or for different platforms.

A code generator may generate code implementing the GUI in a language specific to that code generator. The implementation may be an executable implementation of the GUI executable by one or more processors. For instance, a code generator may take the GUI model as input and generate an implementation in a first language for a first platform (e.g., for iOS® platform). Another code generator system may generate an implementation of the GUI in a second language using the same GUI model for the first platform, and a third code generator may generate another implementation of the GUI using the same GUI model for an Android® platform. A code generation template may be made up of one or more source code files containing high-level code (which may comprise methods, functions, classes, event handlers, and the like) that can be compiled or interpreted to generate a GUI executable that can be executed by one or more processors of a computer system.

In this manner, a executable implementation of the GUI can be automatically generated based upon the GUI model, where the executable implementation encapsulates the look and feel of the GUI, the functionalities of the GUI, and mapping or associations to data models corresponding to the UI components, as described in the GUI design information.

In some embodiments, developers may further augment the code template implementation with additional code to complete or enhance (e.g., add additional functionality to) the code base. For example, a code generator may be configured to receive one or more files comprising markup code (e.g., XML) corresponding to the GUI model and output a GUI implementation comprising one or more source code files by translating the markup code into (high-level) source code (e.g., in Java, C++, or other languages). A code implementation may then be compiled (or interpreted, or some other processing performed on it) to generate an executable version of the GUI. In some embodiments, the GUI model (e.g., in JSON format) can be used to generate code in different programming languages, such as markup languages (e.g., HTML or XML) or stylesheet languages (e.g., cascading style sheet (CSS)).

As described above, a drawback of most OCR techniques is that they may fail to detect text content when light colored text is present on dark background, such as white text present in a blue colored background. According to certain embodiments, a fully convolutional network model (e.g., EAST technique as described above) may be used to detect text content items in the GUI screen image and determine the locations (e.g., the coordinates of the bounding boxes) and/or the dimensions of the text content items. The sub-images at the determined locations may then be extracted, and an improved OCR process may be performed on each of the extracted sub-images to extract the text information associated with each text content item.

Figure 7:
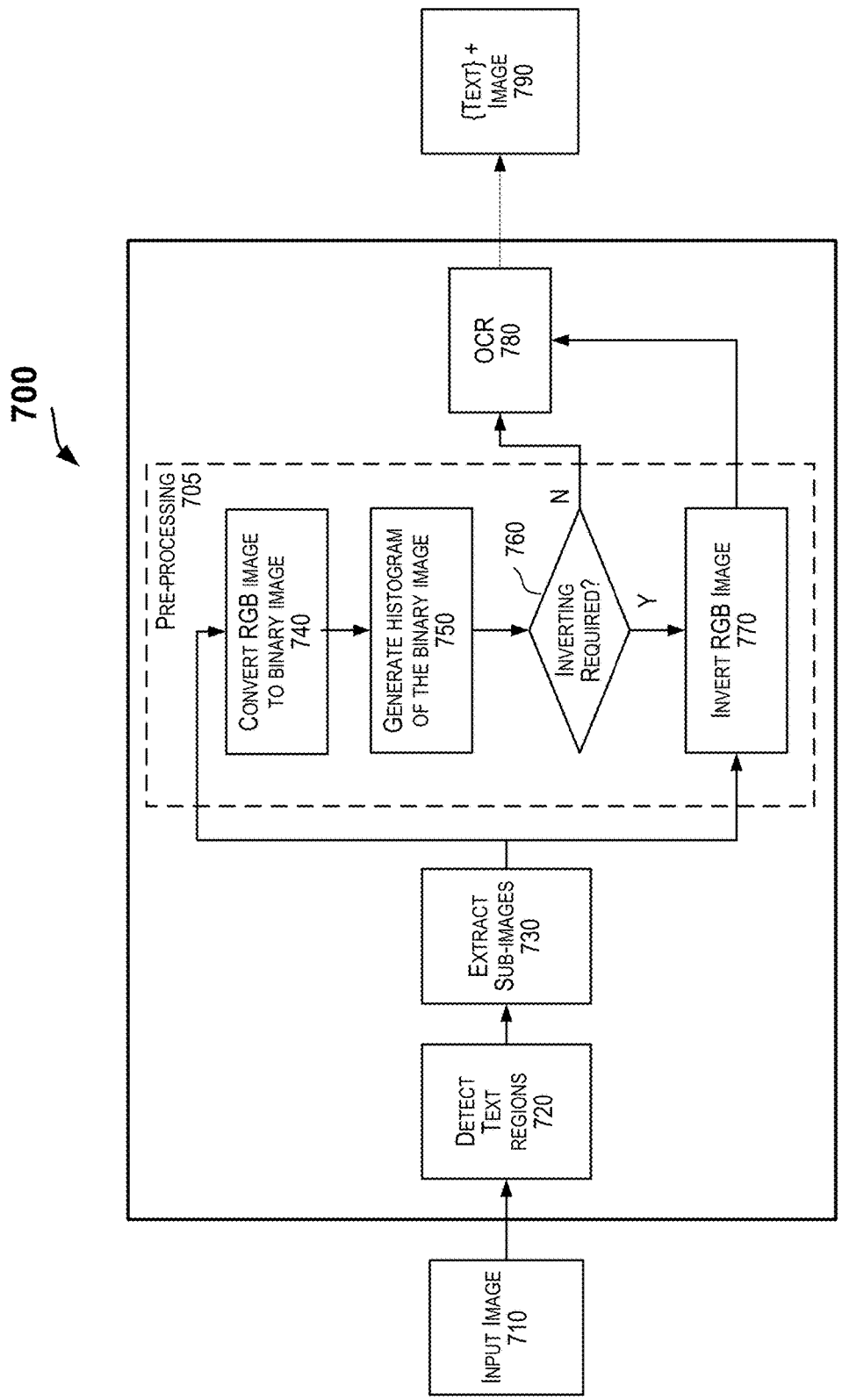
FIG. 7 is a simplified flowchart depicting high-level processing performed for extracting text content items from an image of a GUI screen according to certain embodiments.

FIG. 7 is a simplified flowchart 700 depicting high-level processing performed for extracting text content items from an image of a GUI screen according to certain embodiments. The processing described in flowchart 700 may be performed by, for example, OCR module 352, and may be used to extract text information from GUI screen image or training images as described above with respect to 606 and 504. The processing depicted in FIG. 7 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 7 are not intended to be limiting. It is noted that the processing steps may be performed in an order different from that depicted in FIG. 7, and that not all steps depicted in FIG. 7 need to be performed.

At 710, an input image (e.g., a GUI screen image) may be submitted to a text extraction module (e.g., OCR module 352). At 720, text regions in the input image may be detected using, for example, the EAST technique described above. The EAST technique may provide accurate estimates of the coordinates bounding the regions where text content items are present in the input image. At 730, the sub-image of each region corresponding to a text content item may be extracted. In some embodiments, the sub-image may include a margin added to the region corresponding to the text content item. Each sub-image may be pre-processed at 705 before the OCR processing is performed at 780 to recognize the text content item in the sub-image.

In some embodiments, the pre-processing at 705 may include converting the sub-image in RGB format into binary sub-image using adaptive thresholding at 740. For example, if the intensity value for a pixel is higher than a threshold value, the value of the pixel may be set to a value that represents a white pixel (e.g., a "1"). Otherwise, the value of the pixel may be set to a value that represent a black pixel (e.g., a "0"). A histogram may be generated for the binary sub-image at 750. At 760, the text extraction module may determine whether the sub-image needs to be inverted by changing the intensity value of each pixel to a complementary value. In general, the number of pixels corresponding to the text may be less than the number of pixels corresponding to the background within each sub-image. Thus, if the histogram indicates that the number of black pixels is more than the number of white pixels in the binary sub-image, the text may have higher intensity values (i.e., lighter) than the background, and thus the RGB sub-image may need to be inverted. Otherwise, the text may have lower intensity values (darker) than the background, and thus the RGB sub-image may not need to be inverted. In some embodiments, a histogram may be generated for the RGB sub-image and used to determine if the text is lighter than the background. At 770, the RGB sub-image may be inverted. For example, if the maximum intensity value is 255 and the intensity value of each pixel is $x_i$, the value of each pixel in the inverted image may become $255-x_i$.

At 780, the RGB sub-image or inverted RGB sub-image may be processed to recognize the text content item in the sub-image. Because the text in the RGB sub-image or inverted RGB sub-image may be darker than the background, the text content item may be more accurately recognized. As described above, in some embodiments, a machine learning-based technique may be used to recognize text content items that may include, for example, handwritten characters. At 790, the recognized text in each text content item and the location (e.g., bounding box coordinates) for each text content item may be saved in a storage device or provided to the next processing module in the model generator (e.g., model generator 120 or 350). As described above, in some embodiments, the sub-image may be replaced by a placeholder to remove the text content item. Thus, the resultant image may not include any text content and may be provided to the next processing module for UI component detection and classification.

Figure 8:
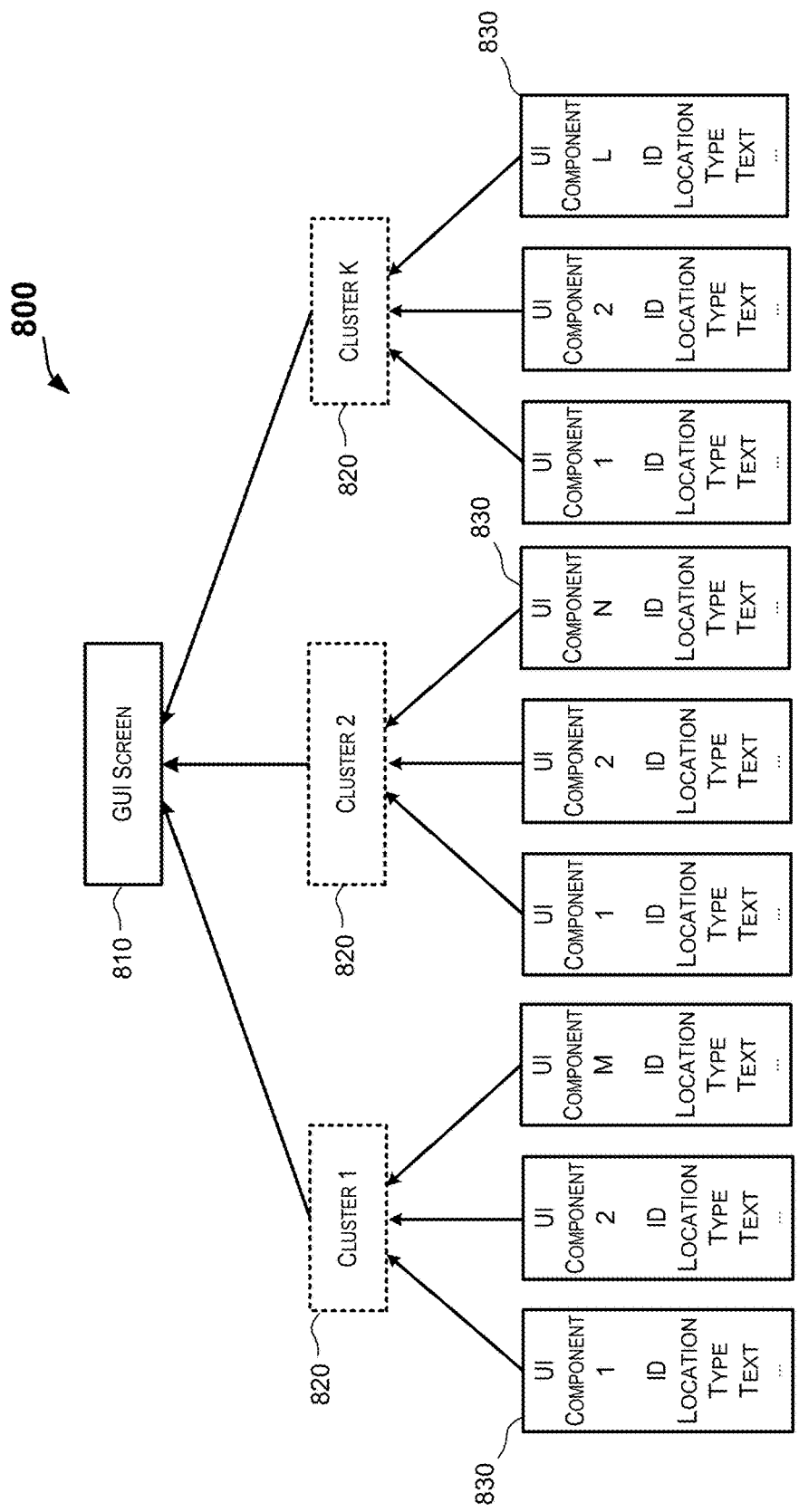
FIG. 8 depicts an example of a UI component hierarchy that may be generated for a graphic user interface screen by clustering UI components according to certain embodiments.

FIG. 8 depicts an example of a UI component hierarchy 800 that may be generated for a graphic user interface screen by clustering UI components and/or text content items according to certain embodiments. UI component hierarchy 800 may be generated based on the clustering of the UI components and/or text content items, and may be used for determine an optimum layout for the GUI screen. In some embodiments, UI component hierarchy 800 may describe how UI components are hierarchically organized in the GUI screen as described above. In the example shown in FIG. 8, a GUI screen 810 may include K clusters 820. Each cluster 820 may include one or more UI components 830. For example, cluster 1 may include M UI components 830, cluster 2 may include N UI components 830, ..., cluster K may include L UI components 830. Each UI component 830 may have associated attributes that may be determined as described above. For example, each UI component 830 may have an associated identification, location and size information, type of UI component as classified by the machine learning-based classifier, associated text (if any), and other information as described above, such as the image or the source of the image, the function, the corresponding action, corresponding code, link to other application or GUI screen, and the like, for the UI component. These associated attributes for each UI component may be used by a model generator (e.g., model generator 120 or 350) to generate the GUI model.

In the following descriptions, specific embodiments are described. These specific embodiments are for illustration purposes only, and are not intended to be limiting. In some of these embodiments, the automatic GUI model and code generation techniques disclosed herein may be implemented as a part of an integrated development environment (IDE), such as Oracle® Visual Builder Cloud Service development environment. In some embodiments, the automatic GUI model and code generation techniques disclosed herein may be implemented as a standalone tool.

Figure 9:
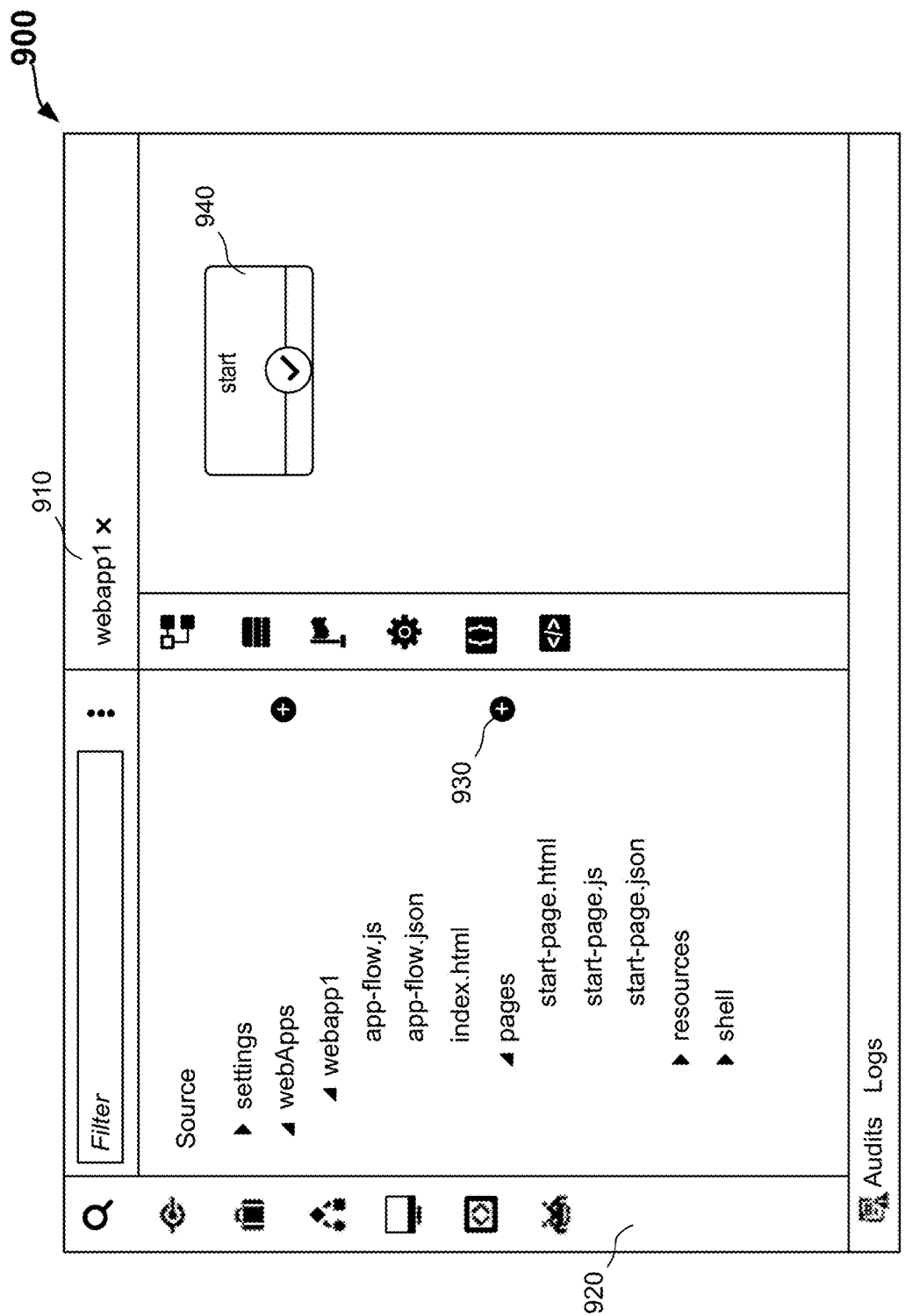
FIG. 9 depicts an example of a GUI screen of a software application for automatically generating a GUI model and GUI code for a GUI screen according to certain embodiments.

FIG. 9 depicts an example of a GUI screen 900 of a software application for automatically generating a GUI model and GUI code for a GUI screen according to certain embodiments. As shown in FIG. 9, a bare-bone new web application webapp1 910 may be started in an IDE. The bare-bone new web application webapp1 910 may only include a start page 940. The file structure 920 of the webapp1 910 is shown in the left panel. To add a new GUI, a user, such as a UI developer, may click the "⊕" button 930.

Figure 10:
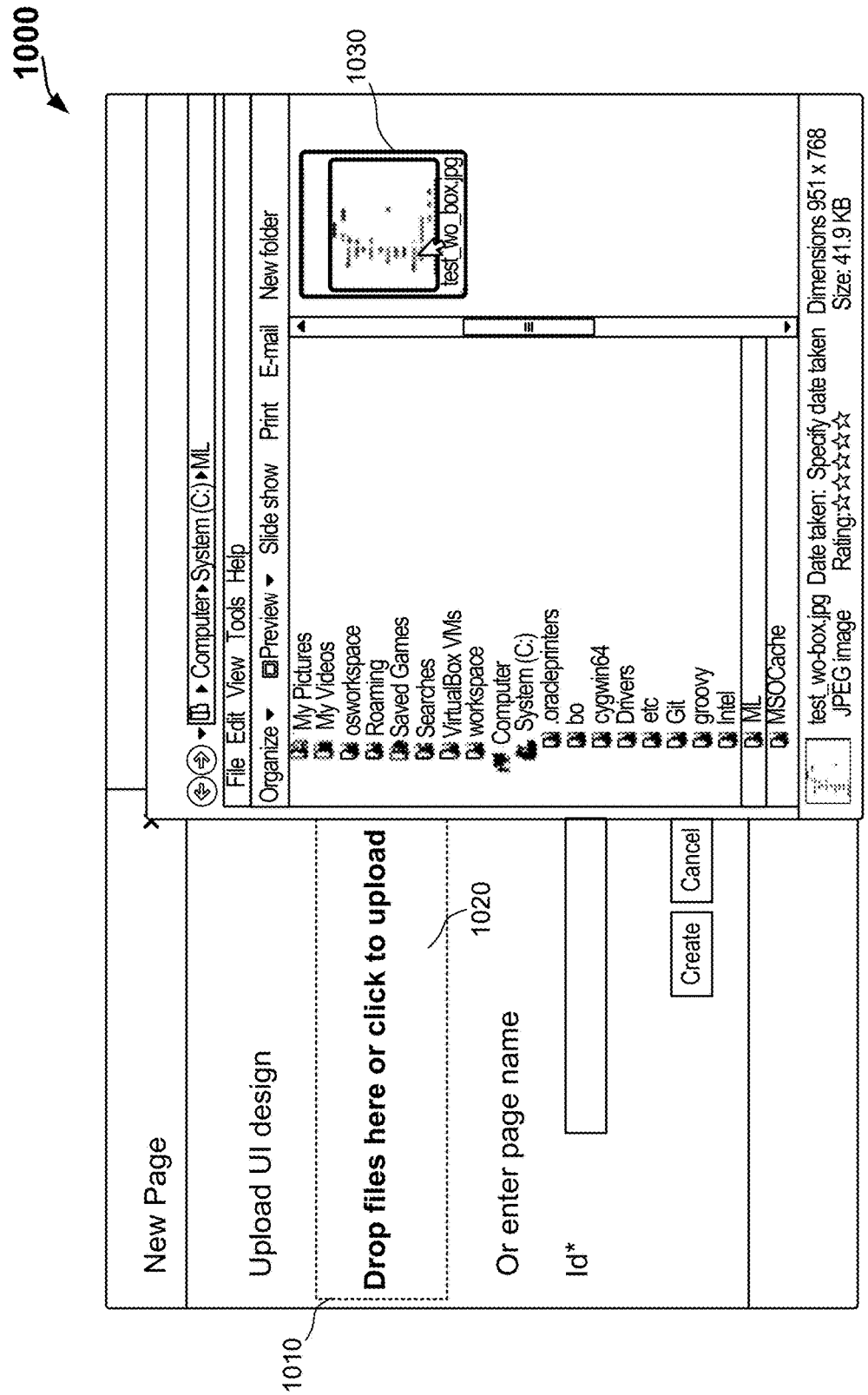
FIG. 10 depicts an example of a GUI screen of a software application for automatically generating a GUI model and GUI code for a GUI screen according to certain embodiments.

FIG. 10 depicts an example of a GUI screen 1000 of a software application for automatically generating a GUI model and GUI code for a GUI screen according to certain embodiments. GUI screen 1000 shows a user interface 1010 displayed to the user after the user click the "⊕" button 930. User interface 1010 may prompt the user to enter or upload a GUI design file to an input box 1020. The GUI design file may include one or more image files that are designed by a GUI designer on a computer or on paper and saved in digital format, such as image files including pixels or vectors. When input box 1020 is selected (e.g., clicked), a pop-up window 1030 may be displayed to the user such that the user may be able to locate the GUI design file stored locally or remotely.

Figure 11:
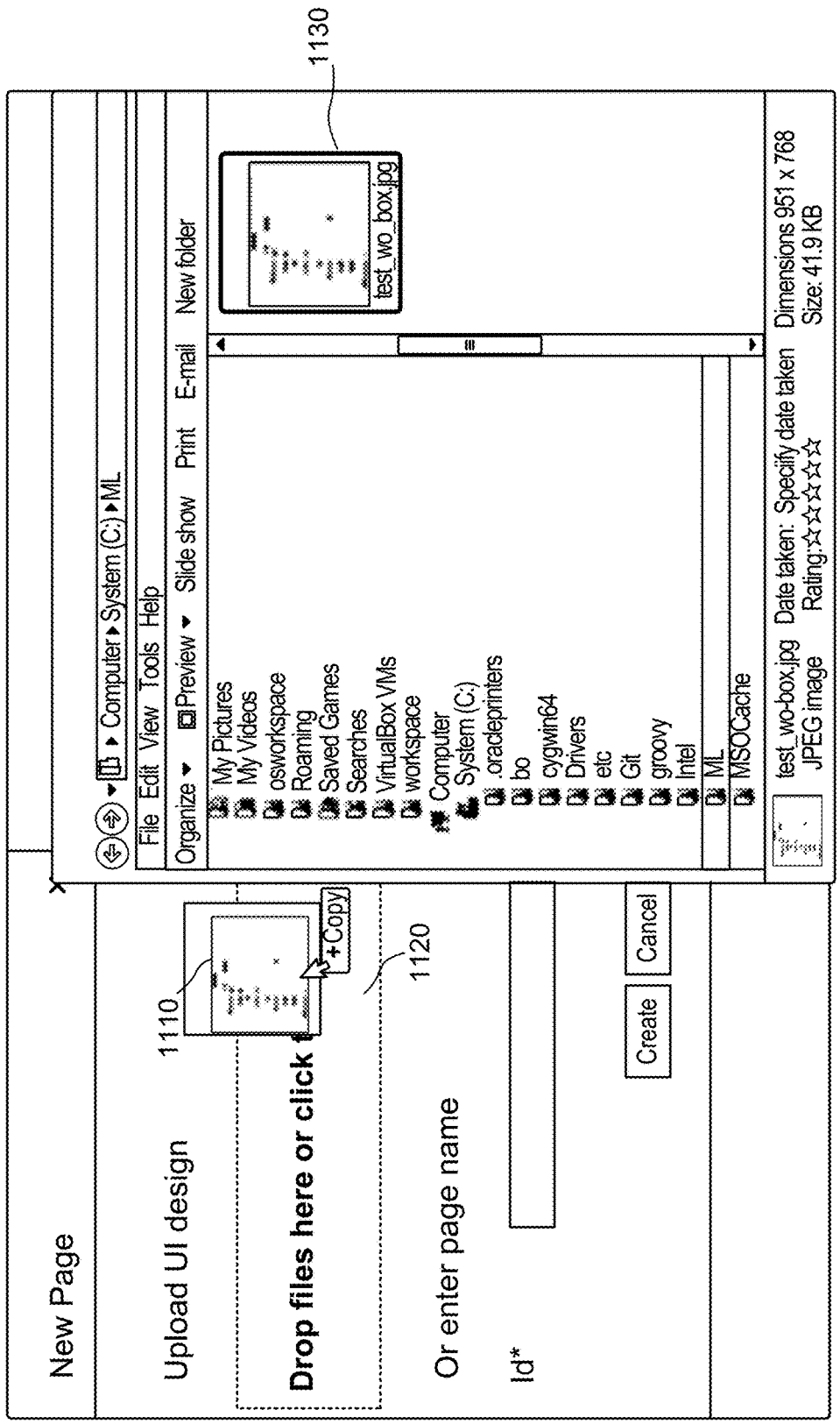
FIG. 11 depicts an example of a GUI screen of a software application for automatically generating a GUI model and GUI code for a GUI screen according to certain embodiments.

FIG. 11 depicts an example of a GUI screen 1100 of a software application for automatically generating a GUI model and GUI code for a GUI screen according to certain embodiments. As shown in FIG. 11, after locating the GUI design file (e.g., an image file) from a pop-up window 1130, the user may select the GUI design file or drag the selected GUI design file as shown by icon 1110 to input box 1120.

Figure 12:
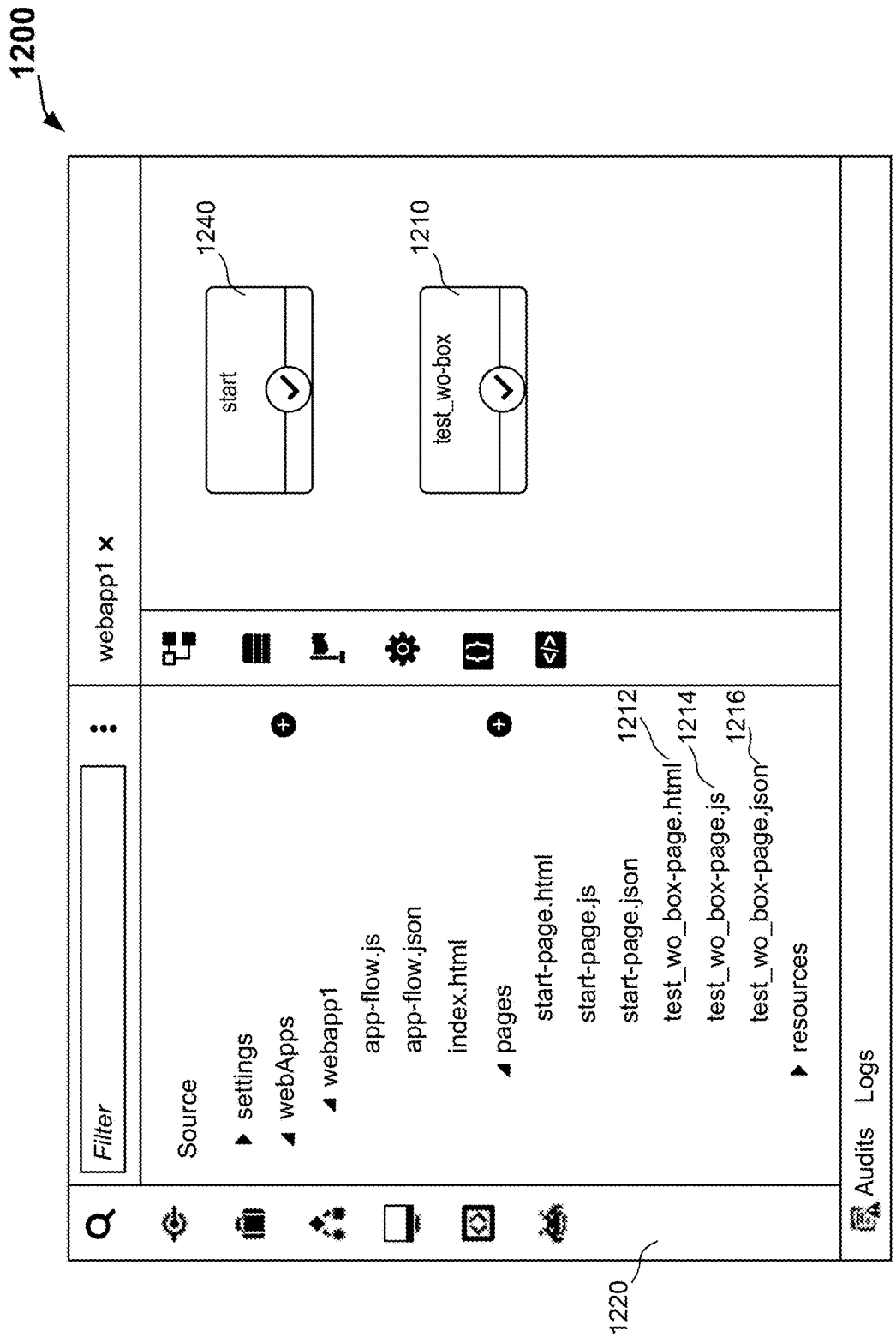
FIG. 12 depicts an example of a GUI screen of a software application for automatically generating a GUI model and GUI code for a GUI screen according to certain embodiments.

FIG. 12 depicts an example of a GUI screen 1200 of a software application for automatically generating a GUI model and GUI code for a GUI screen according to certain embodiments. As shown in FIG. 12, after the GUI design file is upload to the application, a new page 1210 may be generated in addition to a start page 1240. As shown in file structure 1220, a JSON file 1216, a JavaScript file 1214, and an HTML file 1212 for the new GUI may be generated. JSON file 1216 may include the GUI model and HTML file 1212 may include an implementation of the GUI in html format.

FIG. 13 depicts an example of a GUI model 1300 in JSON format generated for a GUI screen according to certain embodiments. GUI model 1300 may correspond to JSON file 1216 shown in FIG. 12. As shown in FIG. 13, GUI model 1300 may describe the layout the GUI screen, various components of the GUI Screen, such as labels, images, and text entry boxes. GUI model 1300 may also indicate texts within some UI components. A user may modify the GUI model using a text editor if needed.

Figure 14:
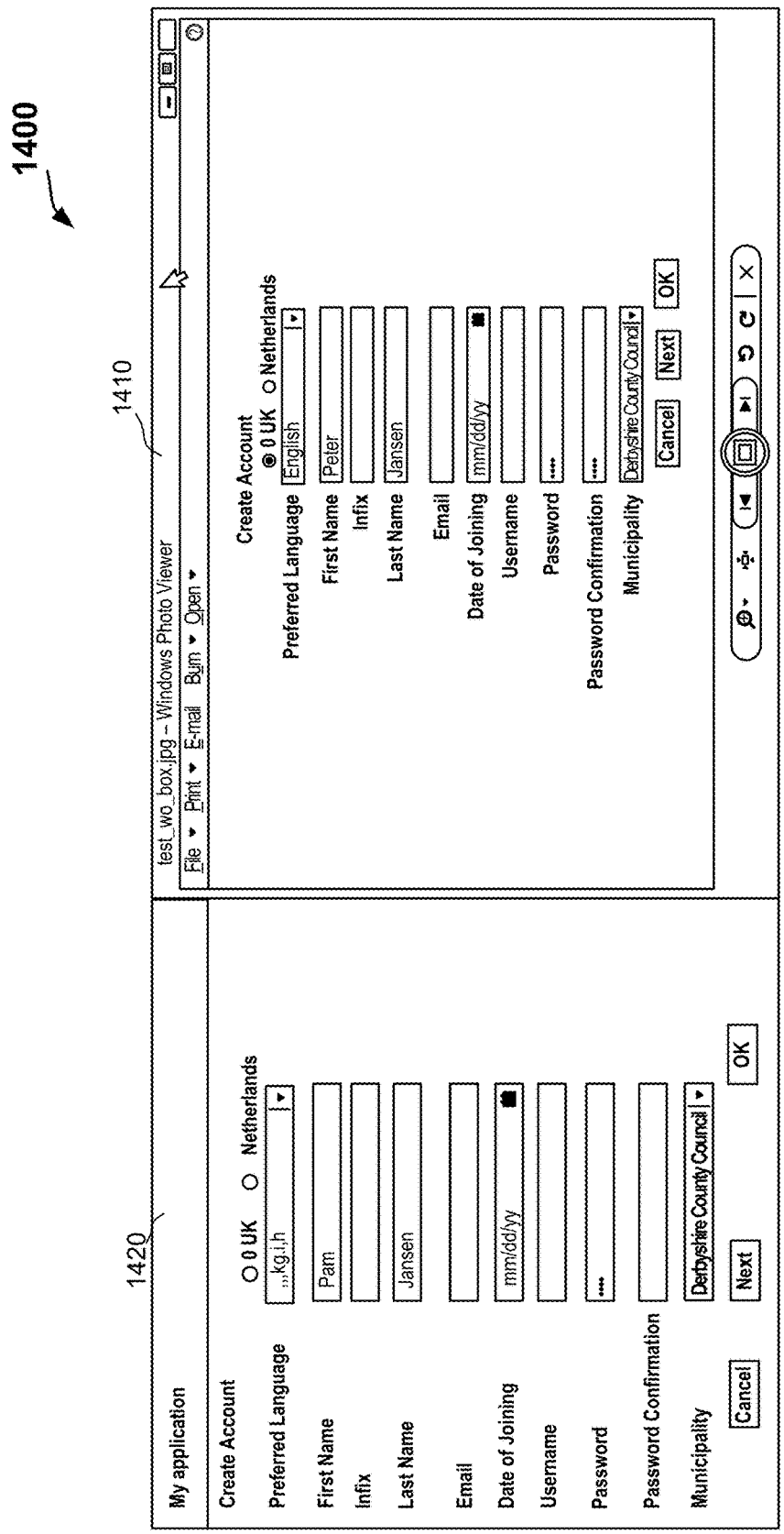
FIG. 14 illustrates an example of an input GUI screen image and the corresponding GUI screen image displayed using code generated based on techniques disclosed herein according to certain embodiments.

FIG. 14 illustrates an example of an input GUI screen image 1410 and the corresponding GUI screen image 1420 displayed using code generated based on techniques disclosed herein according to certain embodiments. Input GUI screen image 1410 is a JPG file displayed by a photo viewer showing the designed GUI screen. GUI screen image 1420 is displayed by a web browser based on a HTML file, such as HTML file 1212.

Figure 15:
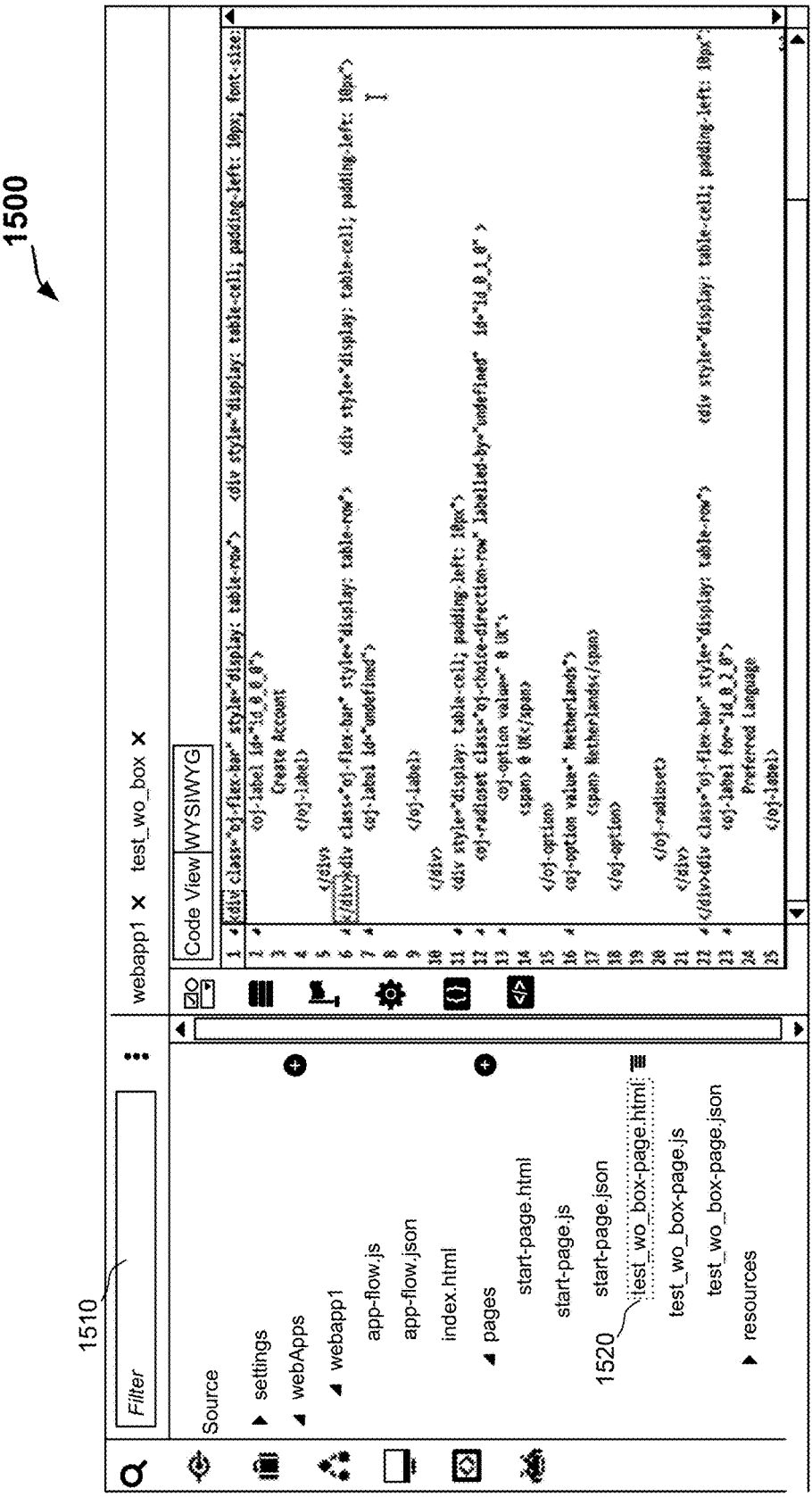
FIG. 15 illustrates an example of html code generated for an example of an input GUI screen image based on techniques disclosed herein according to certain embodiments.

FIG. 15 is an example of a screen shot 1500 showing html code generated for an example of an input GUI screen based on techniques disclosed herein according to certain embodiments. As shown in FIG. 15, when a user selects the HTML file 1520 generated by the tool in file structure 1510, the source HTML code may be displayed to the user, and the user may modify the HTML code as needed.

Figure 16A:
FIGS. 16A and 16B illustrate another example of an input GUI screen image and the corresponding GUI screen image displayed using code generated based on techniques disclosed herein according to certain embodiments.
Figure 16B:

FIGS. 16A and 16B illustrate another example of an input GUI screen image 1600 and the corresponding GUI screen image 1650 displayed using code generated based on techniques disclosed herein according to certain embodiments. Input GUI screen image 1600 is a PNG file displayed by a photo viewer showing the designed GUI screen. GUI screen image 1650 is a snapshot of the GUI displayed by a web browser based on an HTML file automatically generated by a tool implementing techniques disclosed herein.

The model generation system 102 or 330 described herein can be implemented in various different environments including a cloud environment (e.g., various types of clouds including private, public, and hybrid cloud environments), on-premises environment, a hybrid environment, and the like.

Figure 17:
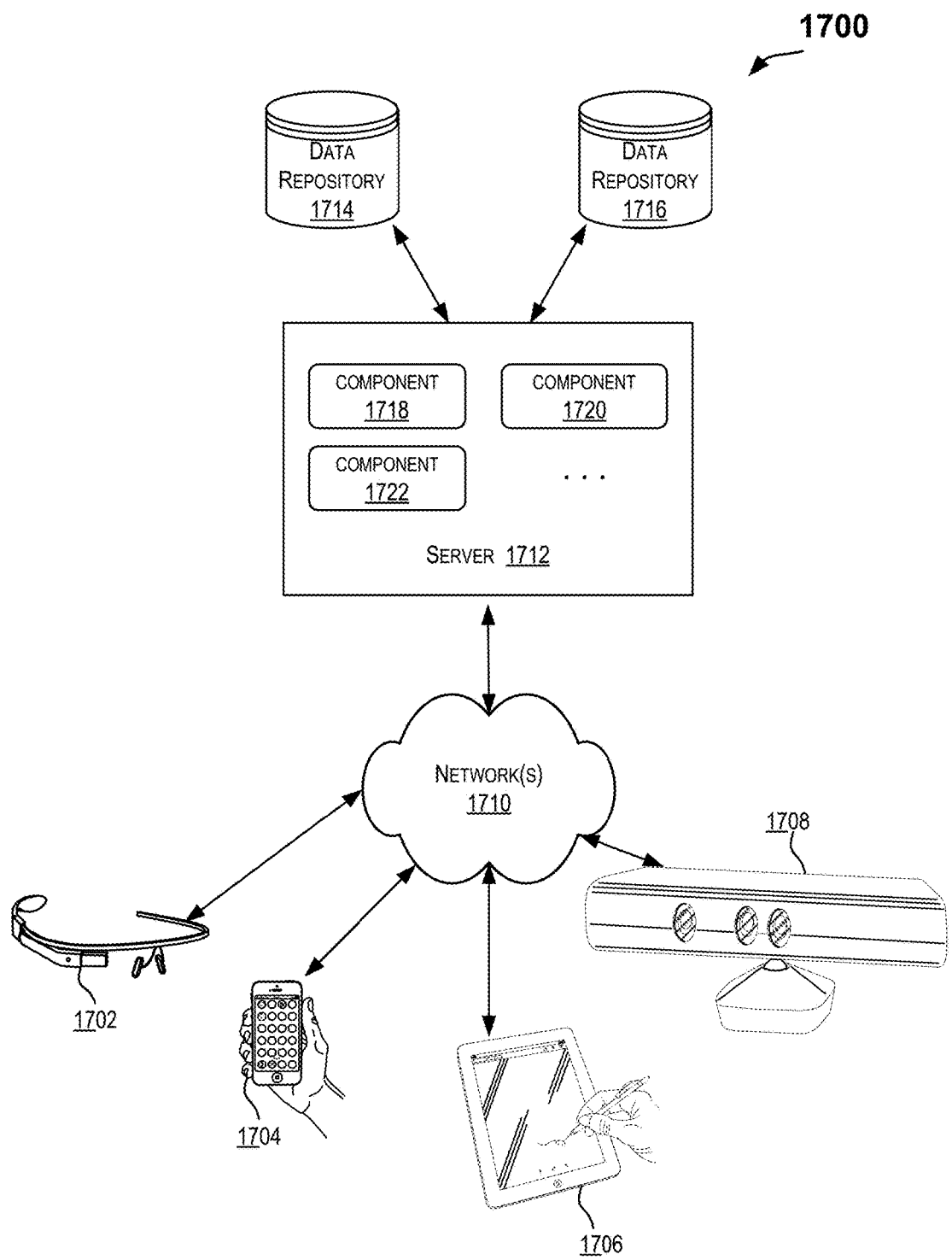
FIG. 17 depicts a simplified diagram of a distributed system for implementing certain embodiments.

FIG. 17 depicts a simplified diagram of a distributed system 1700 for implementing an embodiment. In the illustrated embodiment, distributed system 1700 includes one or more client computing devices 1702, 1704, 1706, and 1708, coupled to a server 1712 via one or more communication networks 1710. Clients computing devices 1702, 1704, 1706, and 1708 may be configured to execute one or more applications.

In various embodiments, server 1712 may be adapted to run or provide one or more services or software applications that enable relations or mappings to be automatically generated between user interface components in an application and data objects using requirements information for the application. For example, in certain embodiments, server 1712 may receive requirements information for an application, where the requirements information may include a description of the desired functionalities for the application and may also include images of desired GUI for the application. Server 1712 may then use the requirements information to generate mappings between the user interface components of the application and one or more data objects.

In certain embodiments, server 1712 may also provide other services or software applications that may be provided in non-virtual and virtual environments. In some embodiments, these services may be offered as web-based or cloud services, such as under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in FIG. 17, server 1712 may include one or more components 1718, 1720 and 1722 that implement the functions performed by server 1712. These components may include software components that may be executed by one or more processors, hardware components, or combinations thereof. It should be appreciated that various different system configurations are possible, which may be different from distributed system 1700. The embodiment shown in FIG. 17 is thus one example of a distributed system for implementing an embodiment system and is not intended to be limiting.

Users may use client computing devices 1702, 1704, 1706, and/or 1708 to provide requirements information to server 1712 and to receive information (e.g., mappings information) from server 1712 in accordance with the teachings of this disclosure. A client device may provide an interface that enables a user of the client device to interact with the client device. The client device may also output information to the user via this interface. Although FIG. 17 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 1710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, communication network(s) 1710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, and the like), server farms, server clusters, or any other appropriate arrangement and/or combination. Server 1712 can include one or more virtual machines running virtual operating systems, or other computing architectures involving virtualization such as one or more flexible pools of logical storage devices that can be virtualized to maintain virtual storage devices for the server. In various embodiments, server 1712 may be adapted to run one or more services or software applications that provide the functionality described in the foregoing disclosure.

The computing systems in server 1712 may run one or more operating systems including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more data repositories 1714, 1716. These data repositories may be used to store data and other information in certain embodiments. For example, one or more of the data repositories 1714, 1716 may be used to store information such as requirements information for one or more applications, mappings information, and other information used by or generated by server 1712. Data repositories 1714, 1716 may reside in a variety of locations. For example, a data repository used by server 1712 may be local to server 1712 or may be remote from server 1712 and in communication with server 1712 via a network-based or dedicated connection. Data repositories 1714, 1716 may be of different types. In certain embodiments, a data repository used by server 1712 may be a database, for example, a relational database, such as databases provided by Oracle Corporation® and other vendors. One or more of these databases may be adapted to enable storage, update, and retrieval of data to and from the database in response to SQL-formatted commands. The data repositories used by applications may be of different types such as, for example, a key-value store repository, an object store repository, or a general storage repository supported by a file system.

Figure 18:
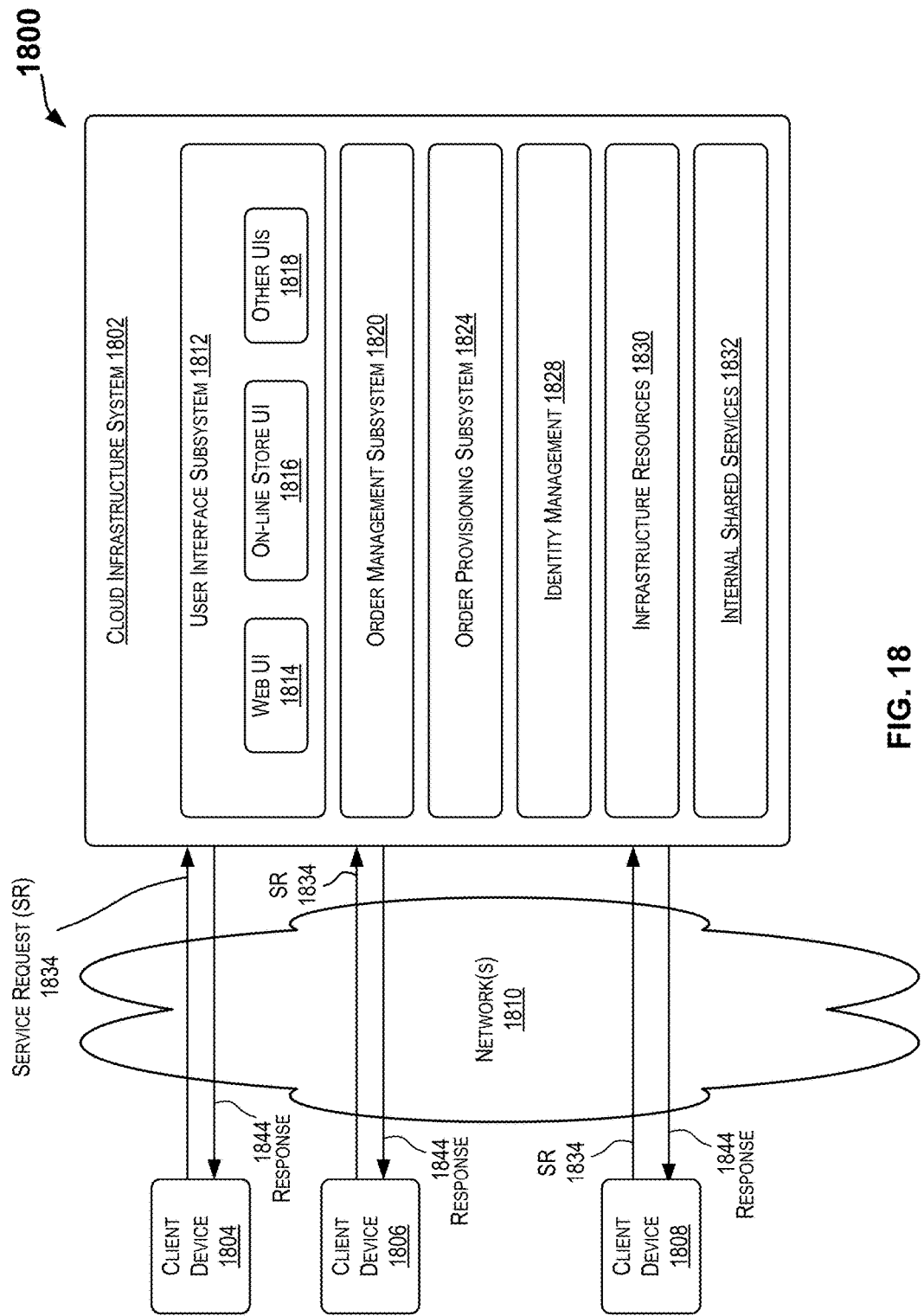
FIG. 18 is a simplified block diagram of a cloud-based system environment in which various services may be offered as cloud services, in accordance with certain embodiments.

In certain embodiments, the features described in this disclosure may be offered as services via a cloud environment. FIG. 18 is a simplified block diagram of a cloud-based system environment in which various services may be offered as cloud services, in accordance with certain embodiments. In the embodiment depicted in FIG. 18, cloud infrastructure system 1802 may provide one or more cloud services that may be requested by users using one or more client devices 1804, 1806, and 1808. Cloud infrastructure system 1802 may comprise one or more computers and/or servers that may include those described above for server 1712. The computers in cloud infrastructure system 1802 may be organized as general purpose computers, specialized server computers, server farms, server clusters, or any other appropriate arrangement and/or combination.

Network(s) 1810 may facilitate communication and exchange of data between client devices 1804, 1806, and 1808 and cloud infrastructure system 1802. Network(s) 1810 may include one or more networks. The networks may be of the same or different types. Network(s) 1810 may support one or more communication protocols, including wired and/or wireless protocols, for facilitating the communications.

The embodiment depicted in FIG. 18 is only one example of a cloud infrastructure system and is not intended to be limiting. It should be appreciated that, in some other embodiments, cloud infrastructure system 1802 may have more or fewer components than those depicted in FIG. 18, may combine two or more components, or may have a different configuration or arrangement of components. For example, although FIG. 18 depicts three client computing devices, any number of client computing devices may be supported in alternative embodiments.

The term cloud service is generally used to refer to a service that is made available to users on demand and via a communication network such as the Internet by systems (e.g., cloud infrastructure system 1802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others. In certain embodiments, the ability to automatically generate a functioning application from requirements information for the application may be provided as a service under the SaaS model.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1802. Cloud infrastructure system 1802 then performs processing to provide the services requested in the customer's subscription order. For example, a user may provide requirements information for an application to the cloud infrastructure system and request the cloud infrastructure system to automatically generate a functioning application from the requirements information, including automatically generating mappings between user interface components of the application and data objects, as described above. Cloud infrastructure system 1802 may be configured to provide one or even multiple cloud services.

Cloud infrastructure system 1802 may provide the cloud services via different deployment models. In a public cloud model, cloud infrastructure system 1802 may be owned by a third party cloud services provider and the cloud services are offered to any general public customer, where the customer can be an individual or an enterprise. In certain other embodiments, under a private cloud model, cloud infrastructure system 1802 may be operated within an organization (e.g., within an enterprise organization) and services provided to customers that are within the organization. For example, the customers may be various departments of an enterprise such as the Human Resources department, the Payroll department, and the like, or even individuals within the enterprise. In certain other embodiments, under a community cloud model, the cloud infrastructure system 1802 and the services provided may be shared by several organizations in a related community. Various other models such as hybrids of the above mentioned models may also be used.

Client devices 1804, 1806, and 1808 may be of different types (such as client devices 1804, 1806, and 1808 depicted in FIG. 18) and may be capable of operating one or more client applications. A user may use a client device to interact with cloud infrastructure system 1802, such as to request a service provided by cloud infrastructure system 1802. For example, a user may use a client device to provide requirements information for an application to cloud infrastructure system 1802 and request the cloud infrastructure system to automatically generate a functioning application from the requirements information, including automatically generating mappings between user interface components of the application and data objects, as described in this disclosure.

In some embodiments, the processing performed by cloud infrastructure system 1802 for providing the requested services may involve big data analysis. This analysis may involve using, analyzing, and manipulating large data sets to detect and visualize various trends, behaviors, relationships, and the like within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 18, cloud infrastructure system 1802 may include infrastructure resources 1830 that are utilized for facilitating the provision of various cloud services offered by cloud infrastructure system 1802. Infrastructure resources 1830 may include, for example, processing resources, storage or memory resources, networking resources, and the like.

In certain embodiments, to facilitate efficient provisioning of these resources for supporting the various cloud services provided by cloud infrastructure system 1802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1802 may itself internally use services 1832 that are shared by different components of cloud infrastructure system 1802 and which facilitate the provisioning of services by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1802 may comprise multiple subsystems. These subsystems may be implemented in software, or hardware, or combinations thereof. As depicted in FIG. 18, the subsystems may include a user interface subsystem 1812 that enables users or customers of cloud infrastructure system 1802 to interact with cloud infrastructure system 1802. User interface subsystem 1812 may include various different interfaces such as a web interface 1814, an online store interface 1816 where cloud services provided by cloud infrastructure system 1802 are advertised and are purchasable by a consumer, and other interfaces 1818. For example, a customer may, using a client device, request (service request 1834) one or more services provided by cloud infrastructure system 1802 by placing subscription orders using one or more of interfaces 1814, 1816, and 1818. These interfaces may include, for example, an online store user interface 1816 that a customer to access and browse an online store identifying cloud services offered by cloud infrastructure system 1802 and place subscription orders for one or more of the offered services that the customer wishes to subscribe to. Other interfaces may include a web interface 1814, and other interfaces 1818.

In certain embodiments, a service request or a subscription request may include information identifying the requesting user or customer and one or more services that the customer desires to subscribe to. For example, a customer may place a subscription order for an automated application generation service offered by cloud infrastructure system 1802.

In certain embodiments, such as the embodiment depicted in FIG. 18, cloud infrastructure system 1802 may comprise an order management subsystem (OMS) 1820 that is configured to process new subscription orders. As part of this processing, OMS 1820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1820 may then invoke the order provisioning subsystem (OPS) 1824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1802 may send a response or notification 1844 to the requesting customer to indicate when the requested service is now ready for use. In some instances, information (e.g., a link) may be sent to the customer that enables the customer to start using and availing the benefits of the requested services.

Cloud infrastructure system 1802 may provide services to multiple customers. For each customer, cloud infrastructure system 1802 is responsible for managing information related to one or more subscription orders received from the customer, maintaining customer data related to the orders, and providing the requested services to the customer. Cloud infrastructure system 1802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1802 may provide services to multiple customers in parallel. Cloud infrastructure system 1802 may store information for these customers, including possibly proprietary information. In certain embodiments, cloud infrastructure system 1802 comprises an identity management subsystem (IMS) 1828 that is configured to manage customers' information and provide the separation of the managed information such that information related to one customer is not accessible to or intermixed with information for another customer. IMS 1828 may be configured to provide various security-related services such as identity services, such as information access management, authentication and authorization services, services for managing customer identities and roles and related capabilities, and the like.

Figure 19:
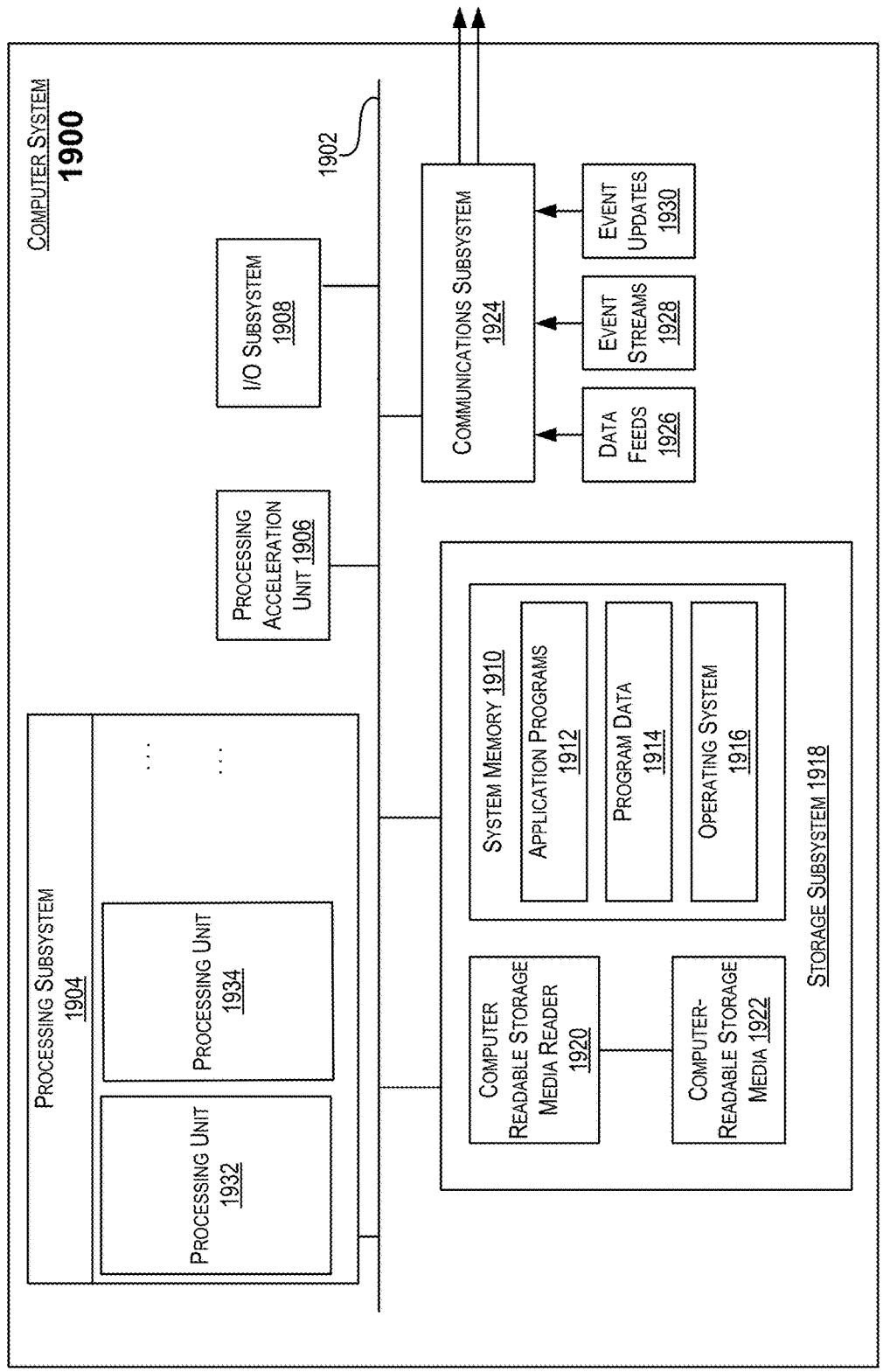
FIG. 19 illustrates an example of a computer system that may be used to implement certain embodiments.

FIG. 19 illustrates an exemplary computer system 1900 that may be used to implement certain embodiments. For example, in some embodiments, computer system 1900 may be used to implement any of the various servers and computer systems described above, such as model generation system 102 depicted in FIG. 1. As shown in FIG. 19, computer system 1900 includes various subsystems including a processing subsystem 1904 that communicates with a number of other subsystems via a bus subsystem 1902. These other subsystems may include a processing acceleration unit 1906, an I/O subsystem 1908, a storage subsystem 1918, and a communications subsystem 1924. Storage subsystem 1918 may include non-transitory computer-readable storage media including storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1904 controls the operation of computer system 1900 and may comprise one or more processors, application specific integrated circuits (ASICs), or field programmable gate arrays (FPGAs). The processors may include be single core or multicore processors. The processing resources of computer system 1900 can be organized into one or more processing units 1932, 1934, and the like. A processing unit may include one or more processors, one or more cores from the same or different processors, a combination of cores and processors, or other combinations of cores and processors. In some embodiments, processing subsystem 1904 can include one or more special purpose co-processors such as graphics processors, digital signal processors (DSPs), or the like. In some embodiments, some or all of the processing units of processing subsystem 1904 can be implemented using customized circuits, such as application specific integrated circuits (ASICs), or field programmable gate arrays (FPGAs).

In some embodiments, the processing units in processing subsystem 1904 can execute instructions stored in system memory 1910 or on computer-readable storage media 1922. In various embodiments, the processing units can execute a variety of programs or code instructions and can maintain multiple concurrently executing programs or processes. At any given time, some or all of the program code to be executed can be resident in system memory 1910 and/or on computer-readable storage media 1922 including potentially on one or more storage devices. Through suitable programming, processing subsystem 1904 can provide various functionalities described above. In instances where computer system 1900 is executing one or more virtual machines, one or more processing units may be allocated to each virtual machine.

In certain embodiments, a processing acceleration unit 1906 may optionally be provided for performing customized processing or for off-loading some of the processing performed by processing subsystem 1904 so as to accelerate the overall processing performed by computer system 1900.

I/O subsystem 1908 may include devices and mechanisms for inputting information to computer system 1900 and/or for outputting information from or via computer system 1900. In general, use of the term input device is intended to include all possible types of devices and mechanisms for inputting information to computer system 1900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1900 to a user or other computer. User interface output devices may include a display subsystem, indicator lights, or non-visual displays such as audio output devices, and the like. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1918 provides a repository or data store for storing information and data that is used by computer system 1900. Storage subsystem 1918 provides an example of a tangible non-transitory computer-readable storage medium for storing the basic programming and data constructs that provide the functionality of some embodiments. Storage subsystem 1918 may store software (e.g., programs, code modules, instructions) that when executed by processing subsystem 1904 provides the functionality described above. The software may be executed by one or more processing units of processing subsystem 1904. Storage subsystem 1918 may also provide a repository for storing data used in accordance with the teachings of this disclosure.

Storage subsystem 1918 may include one or more non-transitory memory devices, including volatile and non-volatile memory devices. As shown in FIG. 19, storage subsystem 1918 includes a system memory 1910 and a computer-readable storage media 1922. System memory 1910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1900, such as during start-up, may typically be stored in the ROM. The RAM typically contains data and/or program modules that are presently being operated and executed by processing subsystem 1904. In some implementations, system memory 1910 may include multiple different types of memory, such as static random access memory (SRAM), dynamic random access memory (DRAM), and the like.

By way of example, and not limitation, as depicted in FIG. 19, system memory 1910 may load application programs 1912 that are being executed, which may include various applications such as Web browsers, mid-tier applications, relational database management systems (RDBMS), and the like, program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS®, Windows® Phone, Android® OS, BlackBerry® OS, Palm® OS operating systems, and others.

Computer-readable storage media 1922 may store programming and data constructs that provide the functionality of some embodiments. Computer-readable storage media 1922 may provide storage of computer-readable instructions, data structures, program modules, and other data for computer system 1900. Software (programs, code modules, instructions) that, when executed by processing subsystem 1904 provides the functionality described above, may be stored in storage subsystem 1918. By way of example, computer-readable storage media 1922 may include non-volatile memory such as a hard disk drive, a magnetic disk drive, an optical disk drive such as a CD ROM, DVD, a Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1918 may also include a computer-readable storage media reader 1920 that can further be connected to computer-readable storage media 1922. Computer-readable storage media reader 1920 may receive and be configured to read data from a memory device such as a disk, a flash drive, and the like.

In certain embodiments, computer system 1900 may support virtualization technologies, including but not limited to virtualization of processing and memory resources. For example, computer system 1900 may provide support for executing one or more virtual machines. In certain embodiments, computer system 1900 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1900. Accordingly, multiple operating systems may potentially be run concurrently by computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to establish a communication channel to one or more client devices via the Internet for receiving and sending information from and to the client devices.

Communication subsystem 1924 may support both wired and/or wireless communication protocols. For example, in certain embodiments, communications subsystem 1924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

Communication subsystem 1924 can receive and transmit data in various forms. For example, in some embodiments, in addition to other forms, communications subsystem 1924 may receive input communications in the form of structured and/or unstructured data feeds 1926, event streams 1928, event updates 1930, and the like. For example, communications subsystem 1924 may be configured to receive (or send) data feeds 1926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1924 may be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to communicate data from computer system 1900 to other computer systems or networks. The data may be communicated in various different forms such as structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1900 depicted in FIG. 19 is intended only as a specific example. Many other configurations having more or fewer components than the system depicted in FIG. 3 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    detecting, by a computer system, from an input image, a graphic user interface (GUI) screen image depicting a GUI screen of a GUI;
    detecting, by the computer system, a first region of the GUI screen image that includes a first text content item;
    determining, by the computer system, a location of the first region within the GUI screen image;
    replacing, by the computer system, the first text content item in the first region with a placeholder that does not include text content;
    detecting, by the computer system, a first user interface (UI) component located in a second region of the GUI screen image, wherein the second region includes the first region with the placeholder that replaces the first text content item;
    determining, by the computer system, a location of the first UI component within the GUI screen image;
    determining, by the computer system using a machine learning-based classifier, a UI component type for the first UI component, wherein the machine learning-based classifier is trained using training data comprising a plurality of training images, each training image in the plurality of training images comprising a UI component, the training data further comprising, for each training image, information identifying a UI component type for the UI component in the training image;
    generating, by the computer system, a GUI model that is usable for generating code for implementing the GUI, the GUI model comprising information for the first UI component and information for the first text content item, wherein the information for the first UI component includes information indicative of the UI component type determined for the first UI component and the location of the first UI component within the GUI screen image; and
    creating one or more implementations of the GUI model, the one or more implementations executable by one or more processors to implement the GUI.

2. The method of claim 1, wherein:
    detecting the first UI component comprises detecting, by the machine learning-based classifier, the first UI component in the GUI screen image; and
    the training data further comprises, for each training image, a location of a UI component within the training image.

3. The method of claim 1, further comprising:
based upon the location of the first region within the GUI screen image and the location of the first UI component within the GUI screen image, grouping the first text content item with the first UI component; and
wherein generating the GUI model further comprises including, in the GUI model, information indicative of the grouping.

4. The method of claim 1, further comprising:
detecting, by the computer system, a third region of the GUI screen image that includes a second text content item;
determining, by the computer system, a location of the third region within the GUI screen image;
detecting, by the computer system, a second UI component located in the GUI screen image;
determining a location of the second UI component within the GUI screen image;
determining, using the machine learning-based classifier, a UI component type for the second UI component;
grouping the first text content item, the second text content item, the first UI component, and the second UI component based upon the location of the first region, the location of the third region, the UI component type and location of the first UI component, and the UI component type and location of the second UI component; and
determining a layout of the GUI screen based upon the grouping,
wherein generating the GUI model further comprises including, in the GUI model, information indicative of the grouping and the layout of the GUI screen.

5. The method of claim 4, further comprising:
determining, based upon the location of the third region within the GUI screen image, that the second text content item is not associated with any UI component in the GUI screen image; and
determining that the second text content item is indicative of an action,
wherein generating the GUI model comprises indicating, in the GUI model, that the second text content item within the third region of the GUI screen image is clickable text, wherein clicking of the second text content item initiates the action.

6. The method of claim 1, wherein the first region comprises the first text content item on a background, the method further comprising:
generating a histogram based on intensity values of pixels in the first region of the GUI screen image;
determining, from the histogram, that intensity values of pixels for the first text content item are higher than intensity values of pixels of the background based upon a number of pixels corresponding to the first text content item and a number of pixels corresponding to the background in the first region of the GUI screen image;
inverting the intensity values of the pixels in the first region, wherein the inverting causes the intensity values of the pixels for the first text content item to be lower than the intensity values of the pixels of the background in the first region; and
recognizing the first text content item in the first region after performing the inverting.

7. The method of claim 6, further comprising:
converting, before generating the histogram, the first region of the GUI screen image from an RGB sub-image to a binary sub-image based upon an intensity value of each pixel in the first region.

8. The method of claim 1, wherein:
the placeholder includes a pre-defined pattern of pixels; and
determining the UI component type for the first UI component comprises classifying the second region of the GUI screen image based upon presence of the placeholder in the second region and the pre-defined pattern of pixels in the placeholder.

9. The method of claim 1, wherein the placeholder is a pre-defined pattern of pixels enabling boundaries of the location of the first text content item in the first region to be determined from the GUI screen image.

10. The method of claim 9, wherein pixel values of the pre-defined pattern of pixels include a pre-defined value or a pixel value of a pixel in a background of the first region.

11. The method of claim 1, wherein generating the one or more implementations of the GUI based upon the GUI model comprises:
generating, using the GUI model, a first implementation of the GUI for a first platform; and
generating, using the GUI model, a second implementation of the GUI for a second platform, wherein the second platform is different from the first platform.

12. The method of claim 1, wherein generating the one or more implementations of the GUI based upon the GUI model comprises:
generating, using the GUI model, a first implementation of the GUI in a first programming language; and
generating, using the GUI model, a second implementation of the GUI in a second programming language, wherein the second programming language is different from the first programming language.

13. The method of claim 1, wherein generating the one or more implementations of the GUI based upon the GUI model comprises:
generating the one or more implementations of the GUI using the GUI model and one or more code generation templates, each code generation template associated with a platform or a programming language.

14. The method of claim 1, wherein generating the GUI model comprises storing information of the GUI model in a JavaScript Object Notation (JSON) format.

15. The method of claim 1, wherein the machine learning-based classifier includes an image histogram-based nonlinear support vector machine classifier or an artificial neural network-based classifier.

16. The method of claim 1, further comprising:
receiving user feedback on the GUI model, wherein the user feedback comprises:
information identifying a new UI component type to be associated with the first UI component instead of the UI component type specified for the first UI component in the GUI model, or
information identifying a new UI component present in the GUI screen but not included in the GUI model, and information indicating a UI component type for the new UI component; and
retraining the machine learning-based classifier based upon the user feedback.

17. The method of claim 16, wherein the user feedback further comprises a sub-image of the first UI component or the new UI component, the method further comprising:
extracting features from the plurality of training images;
mapping the features extracted from the plurality of training images to data points in a multi-dimensional space, wherein the data points form a set of clusters in the multi-dimensional space;

extracting features from the sub-image of the first UI component or the new UI component;

mapping the features extracted from the sub-image of the first UI component or the new UI component to a data point in the multi-dimensional space;

determining a distance between the data point corresponding to the sub-image of the first UI component or the new UI component and a center of each cluster of the set of clusters; and including, in response to determining that the distance is less than a threshold value, the sub-image of the first UI component or the new UI component in the training data.

18. A non-transitory computer readable medium storing a plurality of instructions executable by one or more processors, wherein the plurality of instructions, when executed by the one or more processors, cause the one or more processors to perform processing comprising:

detecting, from an input image, a graphic user interface (GUI) screen image depicting a GUI screen of a GUI;

detecting a first region of the GUI screen image that includes a first text content item;

determining a location of the first region within the GUI screen image;

replacing the first text content item in the first region with a placeholder that does not include text content;

detecting a first user interface (UI) component located in a second region of the GUI screen image, wherein the second region includes the first region with the placeholder that replaces the first text content item;

determining a location of the first UI component within the GUI screen image;

determining, using a machine learning-based classifier, a UI component type for the first UI component, wherein the machine learning-based classifier is trained using training data comprising a plurality of training images, each training image in the plurality of training images comprising a UI component, the training data further comprising, for each training image, information identifying a UI component type for the UI component in the training image;

generating a GUI model that is usable for generating code for implementing the GUI, the GUI model comprising information for the first UI component and information for the first text content item, wherein the information for the first UI component includes information indicative of the UI component type determined for the first UI component and the location of the first UI component within the GUI screen image; and creating one or more implementations of the GUI model, the one or more implementations executable by the one or more processors to implement the GUI.

19. A system comprising:

one or more processors; and a memory coupled to the one or more processors, the memory storing instructions, which, when executed by the one or more processors, cause the system to:

detect, from an input image, a graphic user interface (GUI) screen image depicting a GUI screen of a GUI;

detect a first region of the GUI screen image that includes a first text content item;

determine a location of the first region within the GUI screen image;

replace the first text content item in the first region with a placeholder that does not include text content;

detect a first user interface (UI) component located in a second region of the GUI screen image, wherein the second region includes the first region with the placeholder that replaces the first text content item;

determine a location of the first UI component within the GUI screen image;

determine, using a machine learning-based classifier, a UI component type for the first UI component, wherein the machine learning-based classifier is trained using training data comprising a plurality of training images, each training image in the plurality of training images comprising a UI component, the training data further comprising, for each training image, information identifying a UI component type for the UI component in the training image;

generate a GUI model that is usable for generating code for implementing the GUI, the GUI model comprising information for the first UI component and information for the first text content item, wherein the information for the first UI component includes information indicative of the UI component type determined for the first UI component and the location of the first UI component within the GUI screen image; and create one or more implementations of the GUI model, the one or more implementations executable by the one or more processors to implement the GUI.

* * * * *